United States Patent
Lyons et al.

(10) Patent No.: US 10,661,526 B2
(45) Date of Patent: *May 26, 2020

(54) METHOD OF REINFORCEMENT FOR ADDITIVE MANUFACTURING

(71) Applicant: The Boeing Company, Chicago, IL (US)

(72) Inventors: Brett Ian Lyons, Berkeley, MO (US); Christopher S. Huskamp, Mt. Pleasant, SC (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/994,628

(22) Filed: May 31, 2018

(65) Prior Publication Data
US 2018/0272652 A1 Sep. 27, 2018

Related U.S. Application Data

(63) Continuation of application No. 13/707,793, filed on Dec. 7, 2012, now Pat. No. 10,011,089.
(Continued)

(51) Int. Cl.
*B32B 5/16* (2006.01)
*B33Y 70/00* (2020.01)
(Continued)

(52) U.S. Cl.
CPC .............. *B32B 5/16* (2013.01); *B22F 3/1055* (2013.01); *B29C 64/00* (2017.08); *B29C 64/135* (2017.08);
(Continued)

(58) Field of Classification Search
CPC ..... B22F 3/1055; B29C 64/00; B29C 64/135; B29C 64/153; B32B 5/16; B33Y 10/00;
(Continued)

(56) References Cited

U.S. PATENT DOCUMENTS 5,360,661 A    11/1994 Muzzy
9,375,783 B2 *  6/2016 Karg ...................... B22D 19/14
(Continued)

FOREIGN PATENT DOCUMENTS

DE        10122492 A1    11/2002
DE     102007016656 A1    10/2008
(Continued)

OTHER PUBLICATIONS

U.S. Appl. No. 13/707,793, filed Dec. 7, 2012.
(Continued)

*Primary Examiner* — Camie S Thompson
(74) *Attorney, Agent, or Firm* — MH2 Technology Law Group LLP

(57) ABSTRACT

Materials and methods is present for manufacturing fiber reinforced parts. A powder material comprising a matrix material of a size particular distribution comprising substantially oriented fiber of a predetermined length distribution and diameter (L/D). A manufactured part that has substantially randomly oriented fiber is provided using an energy delivery system and the powder material.

19 Claims, 26 Drawing Sheets

Related U.S. Application Data

(60) Provisional application No. 61/582,302, filed on Dec. 31, 2011.

(51) Int. Cl.

| | | |
|---|---|---|
| *B22F 3/105* | (2006.01) | |
| *C22C 1/10* | (2006.01) | |
| *C22C 47/14* | (2006.01) | |
| *B29C 64/00* | (2017.01) | |
| *B29C 64/135* | (2017.01) | |
| *B29C 64/153* | (2017.01) | |
| *B33Y 10/00* | (2015.01) | |

(52) U.S. Cl.
CPC ............ *B29C 64/153* (2017.08); *B33Y 70/00* (2014.12); *C22C 1/1084* (2013.01); *C22C 47/14* (2013.01); *B33Y 10/00* (2014.12); *Y02P 10/295* (2015.11); *Y10T 428/298* (2015.01); *Y10T 428/2927* (2015.01)

(58) Field of Classification Search
CPC ....... B33Y 70/00; C22C 1/1084; C22C 47/14; Y10T 428/2927; Y10T 428/298; Y02P 10/295
USPC .......................... 264/460, 497; 428/372, 401
See application file for complete search history.

(56) References Cited

U.S. PATENT DOCUMENTS

| | | | |
|---|---|---|---|
| 10,011,089 B2* | 7/2018 | Lyons | B32B 5/16 |
| 2004/0021256 A1 | 2/2004 | DeGrange et al. | |
| 2005/0207931 A1 | 9/2005 | Hesse et al. | |
| 2005/0278061 A1 | 12/2005 | DeGrange et al. | |
| 2006/0052508 A1 | 3/2006 | Cevolini | |
| 2007/0267766 A1 | 11/2007 | Hesse et al. | |
| 2008/0152910 A1 | 6/2008 | Hesse et al. | |
| 2008/0153947 A1 | 6/2008 | Booth et al. | |
| 2009/0295042 A1 | 12/2009 | Pfister et al. | |
| 2010/0152356 A1 | 6/2010 | Cevolini | |
| 2010/0171241 A1 | 7/2010 | Huskamp et al. | |
| 2010/0255327 A1 | 10/2010 | Booth et al. | |
| 2013/0056672 A1* | 3/2013 | Johnston | B22F 3/1055 252/62.54 |

FOREIGN PATENT DOCUMENTS

| | | |
|---|---|---|
| DE | 102007024469 A1 | 11/2008 |
| EP | 1676497 A1 | 7/2006 |
| WO | 9729148 A1 | 8/1997 |
| WO | 2005090448 A1 | 9/2005 |
| WO | 2010/080659 A2 | 7/2010 |

OTHER PUBLICATIONS

U.S. Appl. No. 61/582,302, filed Dec. 31, 2011.
Floersheim et al., "CFPC Material Characteristics and SLS Prototyping Process," Rapid Prototyping Journal, Jan. 1, 2009, pp. 339-345.
Yan et al., "Preparation, characterization and processing of carbon fibre/polyamide-12 composites for selective laser sintering," Composites Science Technology, 71(2011), 1834-1841.
Folgar, Luis, "Developing Nanocomposites for Isotropic Selective Laser Sintering," mtadditive.com, Oct. 12, 2012, downloaded from <http://wwwlmtadditive.com/articles/devleloping-nanocomposites_for_isotropic_selective-laser-sintering> on May 19, 2014, pp. 1-9.
European Patent Office, International Application No. PCT/US2013/069403 International Search Report and Written Opinion dated Jun. 2, 2014, pp. 1-15.
European Patent Office; Office Action for European Patent Application No. 13844550.7 dated Jun. 14, 2017, 4 pages.

* cited by examiner

| PARAMETER | WARM-UP | BUILD | COOL-DOWN | PARAMETER TYPE |
|---|---|---|---|---|
| CHAMBER AIRFLOW DAMPER POSITION | 100 | 100 | 100 | BUILD |
| DOWNDRAFT ENABLED | 0 | 0 | 0 | BUILD |
| CUSTOM DOWNDRAFT ENABLED | 0 | 0 | 0 | BUILD |
| LEFT FEED DISTANCE | 0.0110 | 0.0120 | 0.0110 | BUILD |
| LEFT FEED HEATER OUTPUT LIMIT | 60 | 60 | 60-0 | BUILD |
| LEFT FEED HEATER SET POINT | 91-115 | 115 | 115-15 | BUILD |
| LEFT FEED HEATER WAIT FOR TEMP | 1-0 | 0 | 0 | BUILD |
| MINIMUM LAYER TIME | 40-20 | 20 | 10 | BUILD |
| PART CYLINDER HEATER ENABLED | 1 | 1 | 1-0 | BUILD |
| PART CYLINDER HEATER OUTPUT LIMIT | 100 | 100 | 100 | BUILD |
| PART CYLINDER HEATER SET POINT | 190 | 190 | 190-100 | BUILD |
| PART HEATER OUTPUT LIMIT | 35 | 35 | 35-0 | BUILD |
| PART HEATER SET POINT | 200-270 | 270 | 270-35 | BUILD |
| PART HEATER WAIT FOR TEMP | 0 | 0 | 0-1 | BUILD |
| PART HEATER INNER/OUTER RATIO | 1 | 1 | 1 | BUILD |
| PISTON HEATER ENABLE | 0 | 0 | 0 | BUILD |
| PART HEATER OUTPUT LIMIT | 50 | 50 | 50 | BUILD |
| PISTON HEATER SET POINT | 130-180 | 180 | 175-30 | BUILD |
| POWDER LAYER DELAY | 0 | 7 | 0 | BUILD |
| POWDER LAYER THICKNESS | 0.005 | 0.005 | 0.005 | BUILD |
| RIGHT FEED DISTANCE | 0.0110 | 0.0120 | 0.0110 | BUILD |
| RIGHT FEED HEATER OUTPUT LIMIT | 60 | 60 | 60-0 | BUILD |
| RIGHT FEED HEATER SET POINT | 91-115 | 115 | 115-15 | BUILD |
| RIGHT FEED HEATER WAIT FOR TEMP | 1-0 | 0 | 0 | BUILD |
| ROLLER SPEED | 7.0 | 7.0 | 7.0 | BUILD |
| ROTATE SCAN ORDER | 0 | 0 | 0 | BUILD |
| VECTOR BLOOM ELIMINATION | 1 | 1 | 1 | BUILD |
|  |  |  |  |  |
| FILL LASER POWER | N/A | 55.0 | N/A | PART |
| FILL SCAN COUNT | N/A | 1 | N/A | PART |
| FILL BEAM OFFSET X | N/A | 0.0145 | N/A | PART |
| FILL BEAM OFFSET Y | N/A | 0.0150 | N/A | PART |
| OUTLINE LASER POWER | N/A | 10 | N/A | PART |
| OUTLINE SCAN COUNT | N/A | 1 | N/A | PART |
| OUTLINE BEAM OFFSET X | N/A | 0.0135 | N/A | PART |
| OUTLINE BEAM OFFSET Y | N/A | 0.0130 | N/A | PART |
| SLICER FILL SCAN SPACING | N/A | 0.010 | N/A | PART |
| SORTED FILL ENABLE | N/A | 1 | N/A | PART |

FIG. 9

| PARAMETER | WARM-UP | BUILD | COOL-DOWN | PARAMETER TYPE |
|---|---|---|---|---|
| CHAMBER AIRFLOW DAMPER POSITION | 100 | 100 | 100 | BUILD |
| DOWNDRAFT ENABLED | 0 | 0 | 0 | BUILD |
| CUSTOM DOWNDRAFT ENABLED | 0 | 0 | 0 | BUILD |
| LEFT FEED DISTANCE | 0.0110 | 0.0120 | 0.0110 | BUILD |
| LEFT FEED HEATER OUTPUT LIMIT | 60 | 60 | 60-0 | BUILD |
| LEFT FEED HEATER SET POINT | 91-119 | 119 | 119-15 | BUILD |
| LEFT FEED HEATER WAIT FOR TEMP | 1-0 | 0 | 0 | BUILD |
| MINIMUM LAYER TIME | 20-10 | 10 | 10 | BUILD |
| PART CYLINDER HEATER ENABLED | 1 | 1 | 1-0 | BUILD |
| PART CYLINDER HEATER OUTPUT LIMIT | 100 | 100 | 100 | BUILD |
| PART CYLINDER HEATER SET POINT | 180-225 | 225 | 225-100 | BUILD |
| PART HEATER OUTPUT LIMIT | 35 | 35 | 35-0 | BUILD |
| PART HEATER SET POINT | 200-262 | 262 | 262-35 | BUILD |
| PART HEATER WAIT FOR TEMP | 0 | 0 | 0-1 | BUILD |
| PART HEATER INNER/OUTER RATIO | 1 | 1 | 1 | BUILD |
| PISTON HEATER ENABLE | 0 | 0 | 0 | BUILD |
| PART HEATER OUTPUT LIMIT | 50 | 50 | 50 | BUILD |
| PISTON HEATER SET POINT | 130-180 | 180 | 175-30 | BUILD |
| POWDER LAYER DELAY | 0 | 7 | 0 | BUILD |
| POWDER LAYER THICKNESS | 0.005 | 0.005 | 0.005 | BUILD |
| RIGHT FEED DISTANCE | 0.0110 | 0.0120 | 0.0110 | BUILD |
| RIGHT FEED HEATER OUTPUT LIMIT | 60 | 60 | 60-0 | BUILD |
| RIGHT FEED HEATER SET POINT | 91-119 | 119 | 119-15 | BUILD |
| RIGHT FEED HEATER WAIT FOR TEMP | 1-0 | 0 | 0 | BUILD |
| ROLLER SPEED | 7.0 | 7.0 | 7.0 | BUILD |
| ROTATE SCAN ORDER | 0 | 0 | 0 | BUILD |
| VECTOR BLOOM ELIMINATION | 1 | 1 | 1 | BUILD |
|  |  |  |  |  |
| FILL LASER POWER | N/A | 28.0 | N/A | PART |
| FILL SCAN COUNT | N/A | 1 | N/A | PART |
| FILL BEAM OFFSET X | N/A | 0.0145 | N/A | PART |
| FILL BEAM OFFSET Y | N/A | 0.0150 | N/A | PART |
| OUTLINE LASER POWER | N/A | 10 | N/A | PART |
| OUTLINE SCAN COUNT | N/A | 1 | N/A | PART |
| OUTLINE BEAM OFFSET X | N/A | 0.0135 | N/A | PART |
| OUTLINE BEAM OFFSET Y | N/A | 0.0130 | N/A | PART |
| SLICER FILL SCAN SPACING | N/A | 0.010 | N/A | PART |
| SORTED FILL ENABLE | N/A | 1 | N/A | PART |

| PARAMETER | WARM-UP | BUILD | COOL-DOWN | PARAMETER TYPE |
|---|---|---|---|---|
| CHAMBER AIRFLOW DAMPER POSITION | 100 | 100 | 100 | BUILD |
| DOWNDRAFT ENABLED | 0 | 0 | 0 | BUILD |
| CUSTOM DOWNDRAFT ENABLED | 0 | 0 | 0 | BUILD |
| LEFT FEED DISTANCE | 0.0110 | 0.0120 | 0.0110 | BUILD |
| LEFT FEED HEATER OUTPUT LIMIT | 60 | 60 | 60-0 | BUILD |
| LEFT FEED HEATER SET POINT | 91-119 | 119 | 119-15 | BUILD |
| LEFT FEED HEATER WAIT FOR TEMP | 1-0 | 0 | 0 | BUILD |
| MINIMUM LAYER TIME | 20-10 | 10 | 10 | BUILD |
| PART CYLINDER HEATER ENABLED | 1 | 1 | 1-0 | BUILD |
| PART CYLINDER HEATER OUTPUT LIMIT | 100 | 100 | 100 | BUILD |
| PART CYLINDER HEATER SET POINT | 180-225 | 225 | 225-100 | BUILD |
| PART HEATER OUTPUT LIMIT | 35 | 35 | 35-0 | BUILD |
| PART HEATER SET POINT | 200-262 | 262 | 262-35 | BUILD |
| PART HEATER WAIT FOR TEMP | 0 | 0 | 0-1 | BUILD |
| PART HEATER INNER/OUTER RATIO | 1 | 1 | 1 | BUILD |
| PISTON HEATER ENABLE | 0 | 0 | 0 | BUILD |
| PART HEATER OUTPUT LIMIT | 50 | 50 | 50 | BUILD |
| PISTON HEATER SET POINT | 130-180 | 180 | 175-30 | BUILD |
| POWDER LAYER DELAY | 0 | 7 | 0 | BUILD |
| POWDER LAYER THICKNESS | 0.005 | 0.005 | 0.005 | BUILD |
| RIGHT FEED DISTANCE | 0.0110 | 0.0120 | 0.0110 | BUILD |
| RIGHT FEED HEATER OUTPUT LIMIT | 60 | 60 | 60-0 | BUILD |
| RIGHT FEED HEATER SET POINT | 91-119 | 119 | 119-15 | BUILD |
| RIGHT FEED HEATER WAIT FOR TEMP | 1-0 | 0 | 0 | BUILD |
| ROLLER SPEED | 7.0 | 7.0 | 7.0 | BUILD |
| ROTATE SCAN ORDER | 0 | 0 | 0 | BUILD |
| VECTOR BLOOM ELIMINATION | 1 | 1 | 1 | BUILD |
|  |  |  |  |  |
| FILL LASER POWER | N/A | 28.0 | N/A | PART |
| FILL SCAN COUNT | N/A | 1 | N/A | PART |
| FILL BEAM OFFSET X | N/A | 0.0145 | N/A | PART |
| FILL BEAM OFFSET Y | N/A | 0.0150 | N/A | PART |
| OUTLINE LASER POWER | N/A | 10 | N/A | PART |
| OUTLINE SCAN COUNT | N/A | 1 | N/A | PART |
| OUTLINE BEAM OFFSET X | N/A | 0.0135 | N/A | PART |
| OUTLINE BEAM OFFSET Y | N/A | 0.0130 | N/A | PART |
| SLICER FILL SCAN SPACING | N/A | 0.010 | N/A | PART |
| SORTED FILL ENABLE | N/A | 1 | N/A | PART |

| MATERIAL | ULTIMATE TENSILE STRENGTH (psi) | 0.2% OFFSET YIELD STRENGTH (psi) | % ELONGATION | MELT POINT (°C) |
|---|---|---|---|---|
| PEKK | 10100 | 9700 | 1.9 | 310 |
| PPS | 5200 | 5125 | 1.5 | 280 |
| NYLON 66 | 10200 | 7500 | 4 | 254 |
| NYLON 12 | 6600 | 2800 | 16 | 187 |
| NYLON 11 | 7000 | 3050 | 22 | 186 |

Normalized Fiber Direction

Orientation Distribution Function (ODF)

Normalized Fiber Direction
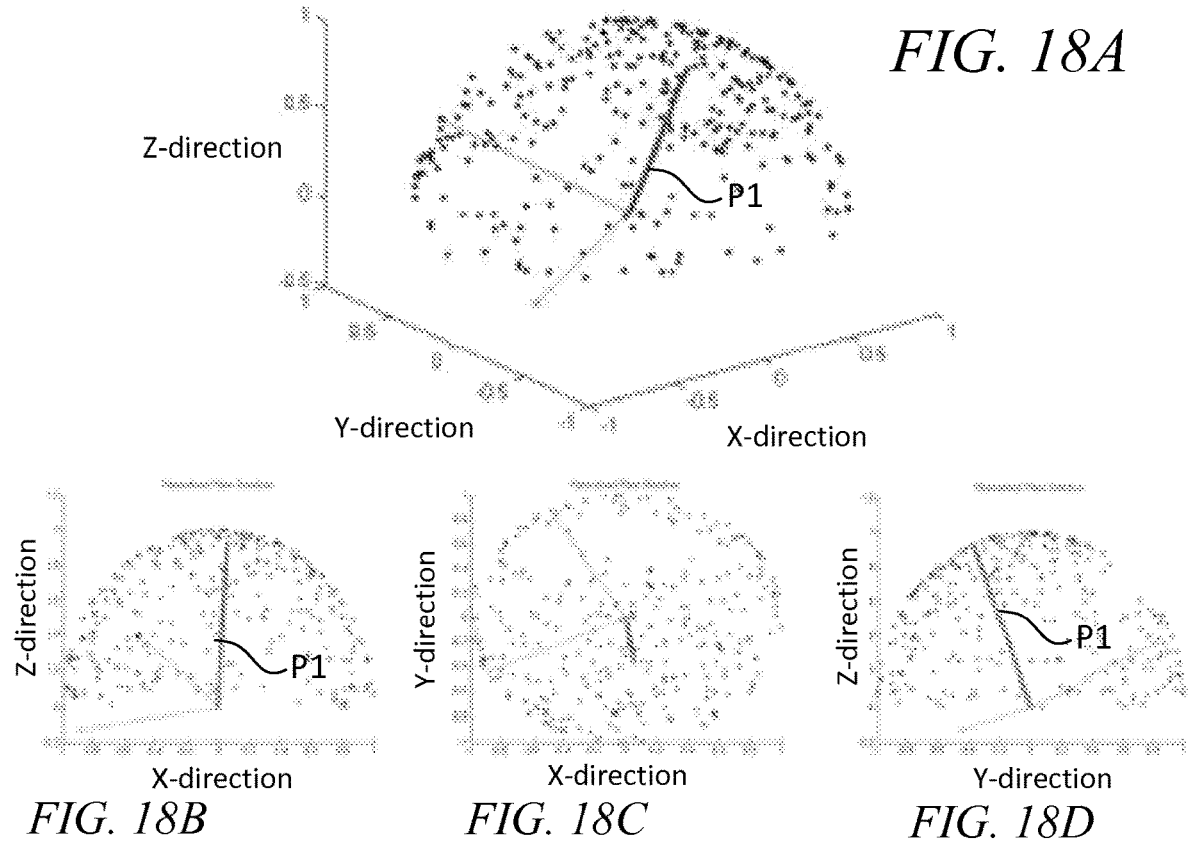
FIG. 18A
FIG. 18B  FIG. 18C  FIG. 18D
Orientation Distribution Function (ODF)
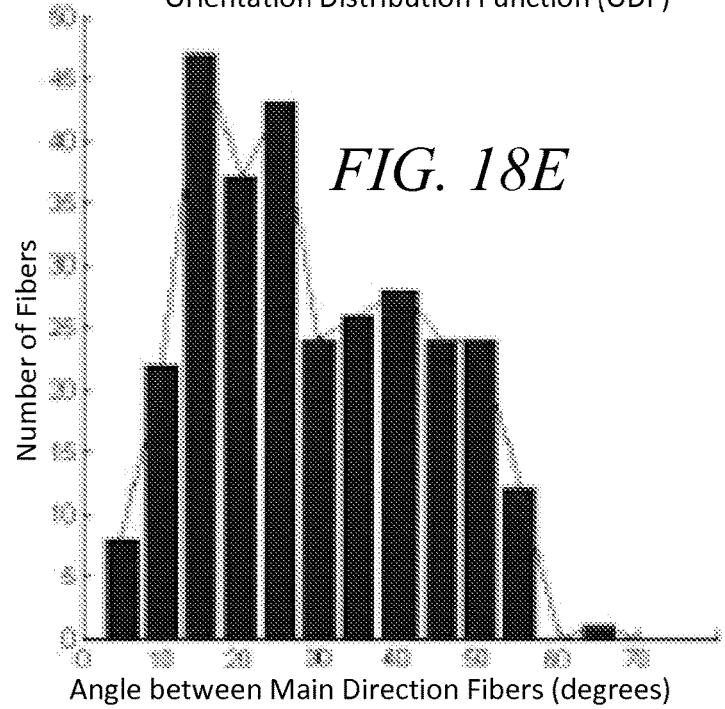
FIG. 18E
Angle between Main Direction Fibers (degrees)

METHOD OF REINFORCEMENT FOR ADDITIVE MANUFACTURING

CROSS-REFERENCE TO RELATED APPLICATIONS

This application is a Continuation of U.S. patent application Ser. No. 13/707,793, now U.S. Pat. No. 10,011,089, filed Dec. 7, 2012, which claims the benefit of U.S. Provisional Application No. 61/582,302 filed on Dec. 31, 2011, the entirety of each of which is incorporated herein by reference.

TECHNICAL FIELD

The present disclosure relates generally to manufacturing parts and, in particular, to manufacturing parts with reinforcing fibers using additive manufacturing methods.

BACKGROUND

Additive manufacturing (AM) is defined by ASTM as the "process of joining materials to make objects from 3D model data, usually layer upon layer, as opposed to subtractive manufacturing methodologies, such as traditional machining. Laser based additive manufacturing is accomplished by directing a high power laser at a target, e.g., a powder, to create a melt pool. Typically, to create the desired geometry, the laser is rastered across the substrate while material is continuously added in a process referred to as Selective Laser Sintering (SLS). SLS fuses the melt pool and/or added material into a three-dimensional object. A laser may selectively fuse small particles in the form of a powdered material by scanning cross sections on the surface of a bed of powder. These cross sections may be identified from a three-dimensional model of the part. As each cross section is scanned, the bed of powder may be lowered by a one layer thickness, and a new layer of powder may be applied on top of the scanned layer. This process may be repeated until the part is completed.

As compared to other manufacturing methods, selective laser sintering can be used to manufacture parts from a relatively wide range of materials. These materials include, for example, polymers, metals, and sand. The process may include full melting, partial melting, or liquid phase sintering.

Selective laser sintering may be used to build prototypes and production parts for use, such as in an aircraft. Selective laser sintering is capable of being used to produce parts with complex geometries within various dimensions.

Aircraft parts typically have stringent and/or extreme design requirements as compared to parts with other applications. These requirements may occur from operating environments that may have high loads and temperatures. Further, these parts also may be required to be capable of withstanding impact loads from maintenance, handling, and/or other types of impact loads. For example, some parts may need to survive usage in some airframe locations that have in-service temperature ranges from around −54 degrees Celsius to around 225 degrees Celsius.

In particular, parts that exist near areas that are heated to or near engine or exhaust temperatures may need to be serviced and handled on the ground in severe winter conditions that may be present above 48 degrees north latitude or at altitude. These conditions require the material that the parts are made of to have sufficient impact resistance at the low end of the temperature range. Simultaneously, sufficient stiffness and mechanical strength must be maintained at the high end of the temperature range to prevent failure in service.

Including reinforcing fibers into AM parts can improve certain mechanical properties, however, such properties generally are constrained to the relative length, diameter, and orientation of the reinforcing fibers and therefore may fall short of parts having the full benefit of reinforcement.

SUMMARY

In one embodiment, a method for manufacturing parts is provided. The method comprising providing powder particles having a predetermined particle size distribution, each of the powder particles having a first average fiber orientation; and introducing directed energy to the plurality of powder particles to provide a manufactured part having a second average fiber orientation substantially more random than the first average fiber orientation.

In another embodiment, a powder for additive manufacturing is provided. The powder comprising a matrix material that is metal or comprised of a polymer that is semi-crystalline, is capable of entering a liquid state and a crystalline state within an overlapping range of temperatures, has a particle size distribution capable of allowing particles to flow through openings formed by larger particles in the particle size distribution; and a plurality of fibers oriented substantially in a first average fiber orientation within the matrix material. The particle is free-flowing and provides manufactured parts having the plurality of fibers oriented in a second average fiber orientation substantially more random than the first average fiber orientation direction.

In yet another embodiment, manufactured part comprising a matrix material having a substantially anisotropic arrangement of reinforcing fibers of a predetermined fiber aspect ratio (diameter/length), the part made by the process of additive manufacturing is provided.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the embodiments are set forth in the appended claims. The embodiments, however, as well as a preferred mode of use, further objectives, and advantages thereof, will best be understood by reference to the following detailed description of an embodiment of the present disclosure when read in conjunction with the accompanying drawings, wherein:

FIG. 8 is a diagram illustrating a table of parameters for a laser sintering machine in accordance with an embodiment;

FIG. 9 is a diagram of a table of parameters for setting a selective sintering machine in accordance with an embodiment;

FIG. 10 is a table illustrating parameters for setting a selective laser sintering system in accordance with an embodiment;

FIGS. 18A, 18B, 18C, 18D and 18E are diagrams representing normalized fiber direction in three dimensions and individual dimensions, respectively, of powder particles prepared from extruded pellets in accordance with an embodiment;

DETAILED DESCRIPTION

Figure 1:
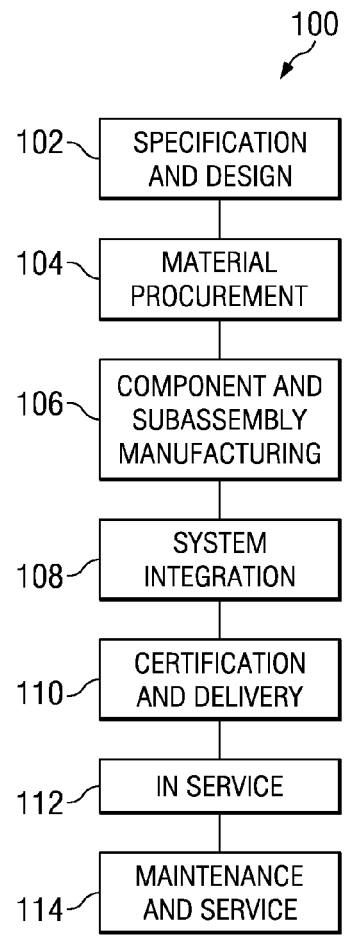
FIG. 1 is a diagram illustrating an aircraft manufacturing and service method in accordance with an embodiment.

It is generally known that the isotropic properties of a fiber-reinforced material can be diminished by shortening the length and/or diameter of the fibers, or if the fibers are preferentially oriented in the manufactured part, thereby imparting anisotropic properties to the part. Certain processes can cause the fibers to break or inadvertently prevent randomly orienting the fibers, or have other processing difficulties, e.g., free-flow, aggregation, etc. As a result, such parts are typically inferior to that of other processes resulting in reduced design options.

Conventional polymer parts made with Additive Manufacturing (AM) processes typically are limited to the extent by which they can be reinforced with second phase additives, such as carbon fibers, glass fibers, etc. This is primarily due to the layer or extrusion thickness limitation and/or material forms (such as powder, liquid or filament) required by the AM process. Current methods for reinforced AM materials yield final parts with highly isotropic mechanical properties, characterized for example by isotropic fiber arrangement or orientation, and/or long fiber lengths. As a result, overall mechanical properties are typically lower than those properties compared to the same material processed, for example, via injection molding or extrusion, thus limiting AM processes for certain applications. The present disclosure provides materials and methods for improving the performance of fiber reinforced manufactured parts using AM methods.

The materials and methods disclosed herein provide for control of one or more reinforcement properties of the fibers in a material matrix suitable for AM processing, in that the materials and methods allow for the use of much shorter length or smaller L/D's of fiber in the matrix compared to that typically used in AM reinforcement applications, without significantly reducing the fiber's reinforcement properties or effecting the material's processability. In one aspect, the fibers are of a predetermined length comparable to that of the matrix particle size, providing for the individual fibers to align in a first average fiber orientation with the fibers substantially parallel and in close proximity with other fibers within discrete particles. This configuration allows for free-flowing particles useful in additive manufacturing and for providing manufactured parts with fibers oriented in a second average fiber orientation that is substantially random relative to the first average fiber orientation of the fibers in the powder particles. As a result, manufactured parts have significantly anisotropic fiber orientation and significantly anisotropic mechanical properties in their respective three dimensions. Such parts, with relatively short fiber length distribution exhibit reinforced properties similar to that of parts having much longer fibers, but with more anisotropic properties.

The materials and methods disclosed herein are not limited to powder bed type AM processes such as Selective Laser Sintering, but can potentially be used in Three Dimensional Printing or Fused Deposition Modeling as well as other rapid prototype processes.

Figure 2:
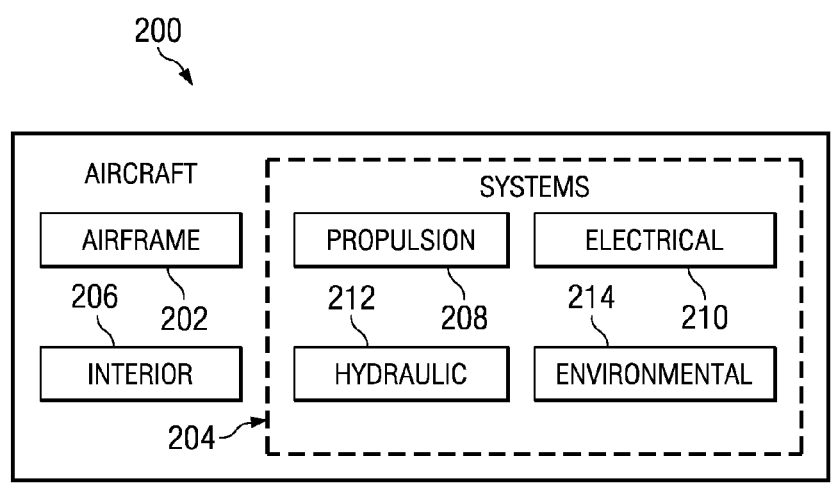
FIG. 2 is a diagram of an aircraft in which an embodiment may be implemented.

Referring more particularly to the drawings, embodiments of the disclosure may be exemplary described in the context of aircraft manufacturing and service method 100 as shown in FIG. 1 and aircraft 200 as shown in FIG. 2. Turning first to FIG. 1, a diagram illustrating an aircraft manufacturing and service method is depicted in accordance with an embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

The different embodiments provide a method for manufacturing parts. The method may include selecting a powder material that is comprised of a polymer that is a semi-crystalline polymer, has an overlap between a melting temperature range and a crystallization temperature range, has a particle size distribution that is substantially a Gaussian distribution, has a particle shape that is substantially spherical, and has a desired melt flow rate that is less than a temperature at which the powder material begins to chemically break down. The part is manufactured using an energy delivery system and the selected powder material.

The different embodiments also provide a method for manufacturing parts in which a powder material that is semi-crystalline is selected. The powder material is capable of entering a liquid state and a crystalline state within an overlapping range of temperatures. The powder material has a particle size distribution capable of allowing particles to flow through openings formed by larger particles in the particle size distribution. The powder material also has a particle shape that is substantially spherical and a desired melt flow rate that occurs at a temperature below a temperature at which the powder material begins to chemically break down.

In other embodiments, a method for manufacturing parts having reinforcing fibers is provided. The method can include selecting a matrix material of a predetermined particle size distribution and optionally a predetermined shape, the matrix material comprising a plurality of reinforcing fibers of at least one of: predetermined fiber aspect ratio, of predetermined fiber aspect ratio, and predetermined weight or volume percentage. In one aspect, the plurality of fibers are substantially isotropically oriented in the matrix material or the powder prepared from the matrix material. The part is manufactured using an energy delivery system and the selected powder material. In one aspect, manufactured parts using a powder of the matrix material comprising a plurality of substantially isotropically oriented reinforcing fibers result in parts with anisotropic fiber orientation and significantly improved anisotropic mechanical properties compared to AM methods using similar material and longer reinforcing fibers.

Figure 3:
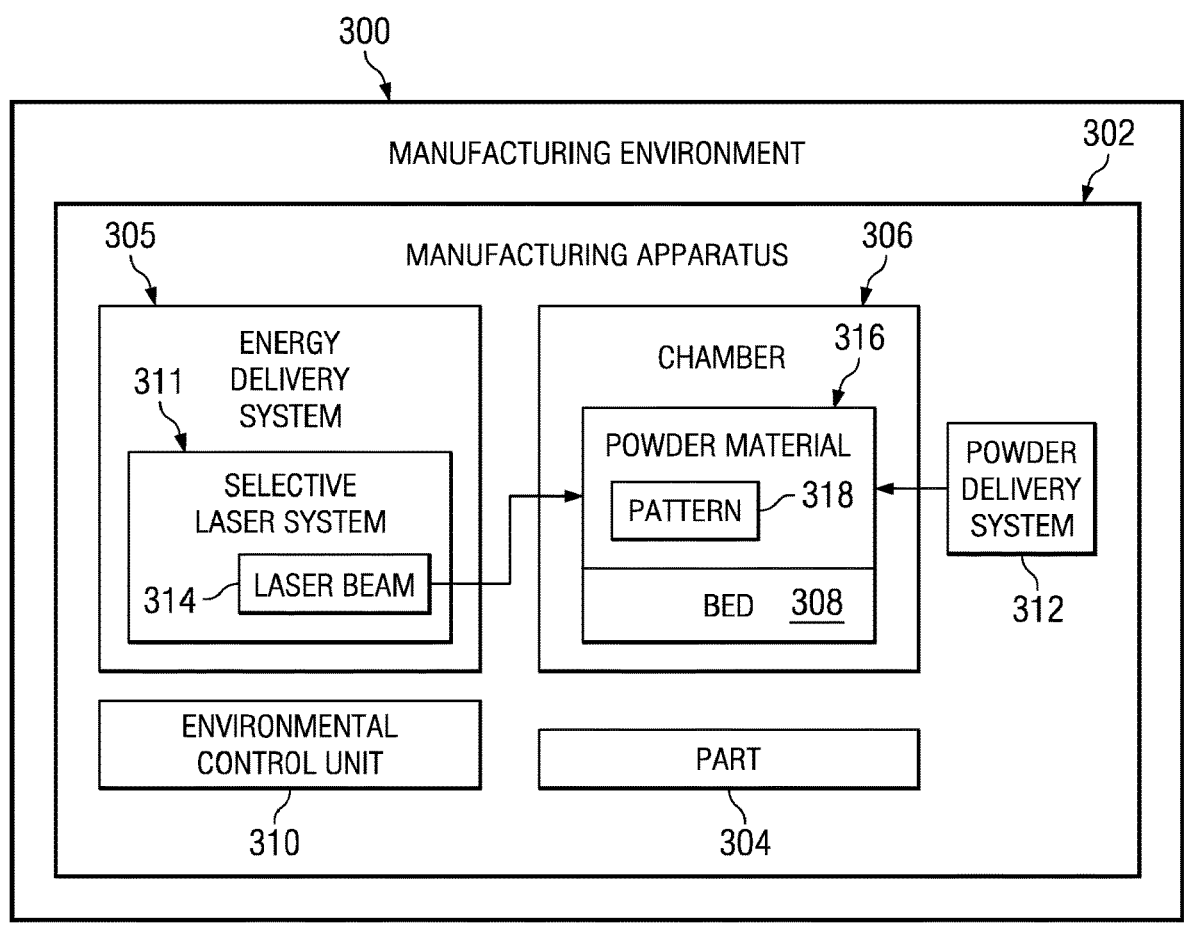
FIG. 3 is a diagram of a manufacturing environment in accordance with an embodiment.

With reference now to FIG. 3, a diagram of a manufacturing environment is depicted in accordance with an embodiment. In this example, manufacturing environment 300 may be used to manufacture parts for aircraft 200 in FIG. 2. As illustrated, manufacturing environment 300 contains manufacturing apparatus 302. Manufacturing apparatus 302 may be used to manufacture part 304.

Manufacturing apparatus 302 may include energy delivery system 305, chamber 306, bed 308, environmental control unit 310, and powder delivery system 312. In these examples, energy delivery system 305 may take the form of selective laser system 311. Selective laser system 311 may be implemented using any device capable of generating laser beam 314 and directing laser beam 314.

Powder delivery system 312 deposits powder material 316 onto bed 308. Selective laser system 311 may direct laser beam 314 onto powder material 316 on bed 308. Laser beam 314 may melt and/or sinter powder material 316 in pattern 318 in a manner to form a portion of part 304.

Bed 308 may lower and another layer of powder material 316 may be deposited onto bed 308. Selective laser system 311 may then direct laser beam 314 onto powder material 316 on bed 308 to form another portion of part 304. In these different embodiments, environmental control unit 310 may control the temperature within chamber 306 and on bed 308. Further, environmental control unit 310 also may maintain a level of oxygen in chamber 306 within some selected amount. The level of oxygen in chamber 306 may be maintained within the selected amount by introducing a gas at a controlled temperature. This gas may be, for example, an inert gas.

For example, environmental control unit 310 may maintain a level of oxygen that is less than around one percent with the input gas temperature at the bed temperature plus 2 degrees Celsius. Environmental control unit 310 may introduce an inert gas, such as nitrogen, into chamber 306.

In the different embodiments, powder material 316 may be selected as a material suitable for aircraft parts. The different embodiments recognize that currently used materials for constructing parts using directed energy systems such as a selective laser sintering system may produce parts using materials having melting points that are lower than may be desired. For example, the different embodiments recognize and take into account that many currently used materials may have a melting point of around 180 to 190 degrees Celsius. In many cases, parts are desired that may be capable of withstanding temperatures of around 250 degrees Celsius and above.

The different embodiments also recognize and take into account that although many plastic materials may meet the temperature range needed for performance, these materials may be unsuitable for manufacturing parts. The different embodiments recognize and take into account that many of these plastic materials currently cannot be used with energy delivery systems, such as selective laser sintering systems. These materials may require molds, which have higher costs and lead times.

With currently available selective laser sintering systems, mechanical parts may be made. These mechanical parts, however, may not have the desired mechanical properties at operating temperatures in which the parts may be used. For example, with selective laser sintering, the different embodiments recognize and take into account that parts may be made with mechanical properties that are suitable for temperatures around 75 degrees Celsius or less. These parts typically become soft and/or lose mechanical properties at around 100 degrees Celsius.

The different embodiments also recognize and take into account that aluminum may be used to create parts using currently available manufacturing processes. This material provides suitable properties at temperatures of around room temperature to around 120 degrees Celsius. The different embodiments, however, recognize and take into account that using aluminum increases the weight of the parts.

Thus, the different embodiments recognize and take into account that it would be desirable to have a polymer that can be used at higher temperatures than currently available materials without a weight penalty of a metal.

In these examples, manufacturing apparatus 302 may take the form of a sintering laser system machine available from 3D Systems, Inc. For example, a Sinter Station® 2500CI system may be used to implement manufacturing apparatus 302. This system may be modified to provide the operating environment needed to process powder material 316. For example, the machine may be modified to run at temperatures of around 330 degrees Celsius or greater. This temperature may be a temperature maintained on the surface of bed 308. These modifications may include ensuring seals, lubricants, and hardware are capable of operating at these temperatures. Further, the machine may be modified to provide an environment that is around one percent or less in oxygen content throughout the range of temperatures.

These modifications may include adding or using a multi-zone heater capable of operating at the desired temperatures. Further, the heating system is capable of reducing thermal gradients. These thermal gradients may be reduced to less than around 10 degrees Celsius within one inch of where a part is to be built. The reduced temperature gradient is to avoid an area in which a material does not properly liquefy, melt, and/or sinter, which may result in low mechanical properties and distortion of parts.

If the gradient results in a high-temperature area in which the temperature change is greater than desired, particles may fuse together generating a porous and hard cake from the powder material. Parts made in this type of condition may have powder material adhere to the parts making those parts dimensionally incorrect and possibly having low strength for a measured cross section.

In maintaining an oxygen level of less than one percent in these examples, nitrogen gas may be pumped into the chamber. Heating of the nitrogen gas also may be necessary to avoid degrading the energy supplied from the laser unit. Of course, any laser sintering system machine capable of processing powder material 316 may be used in addition to the example provided.

Figure 4:
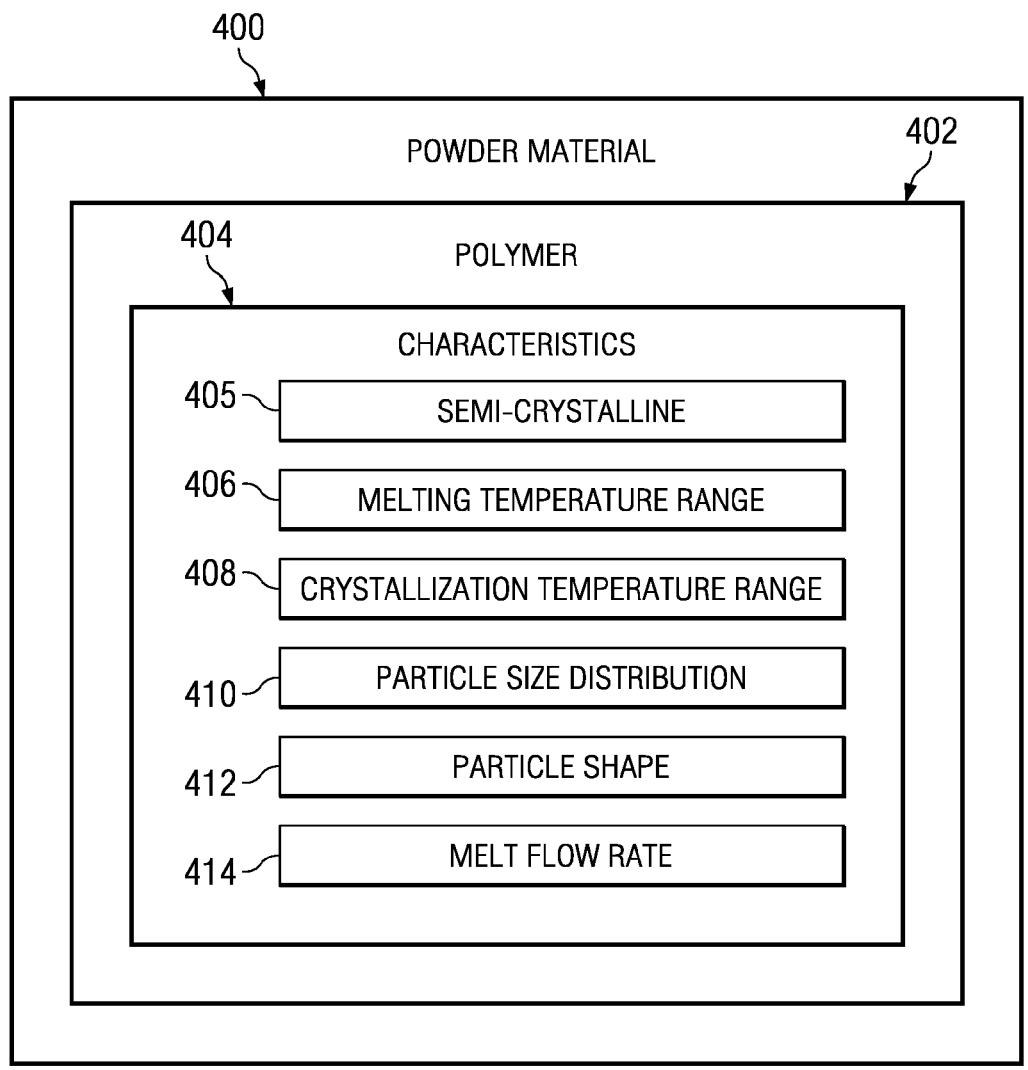
FIG. 4 is a block diagram illustrating characteristics for a powder material for use in manufacturing parts in accordance with an embodiment.

With reference now to FIG. 4, a block diagram illustrating characteristics for a powder material for use in manufacturing parts is depicted in accordance with an embodiment. In this example, powder material 400 is an example of a powder material that may be used to implement powder material 316 in FIG. 3 to manufacture part 304.

Powder material 400 comprises polymer 402. Polymer 402 may have characteristics 404. These characteristics may include, for example, without limitation, semi-crystalline 405, melting temperature range 406, crystallization temperature range 408, particle size distribution 410, particle shape 412, and melt flow rate 414. For example, polymer 402 has melting temperature range 406 and crystallization temperature range 408 that overlap.

In some embodiments, the overlap between melting temperature range 406 and crystallization temperature range 408 may be analyzed on differential scanning calorimetery curves. The overlap between these two ranges of temperatures may be such that the amount of heat absorbed increases when powder material 400 melts and becomes a liquid such that when powder material 400 cools and turns back into a crystallized form, an increase in heat occurs. In the different embodiments, it may be desirable to have an overlap at these increases in heat absorption and heat release at the different temperatures.

Figure 5:
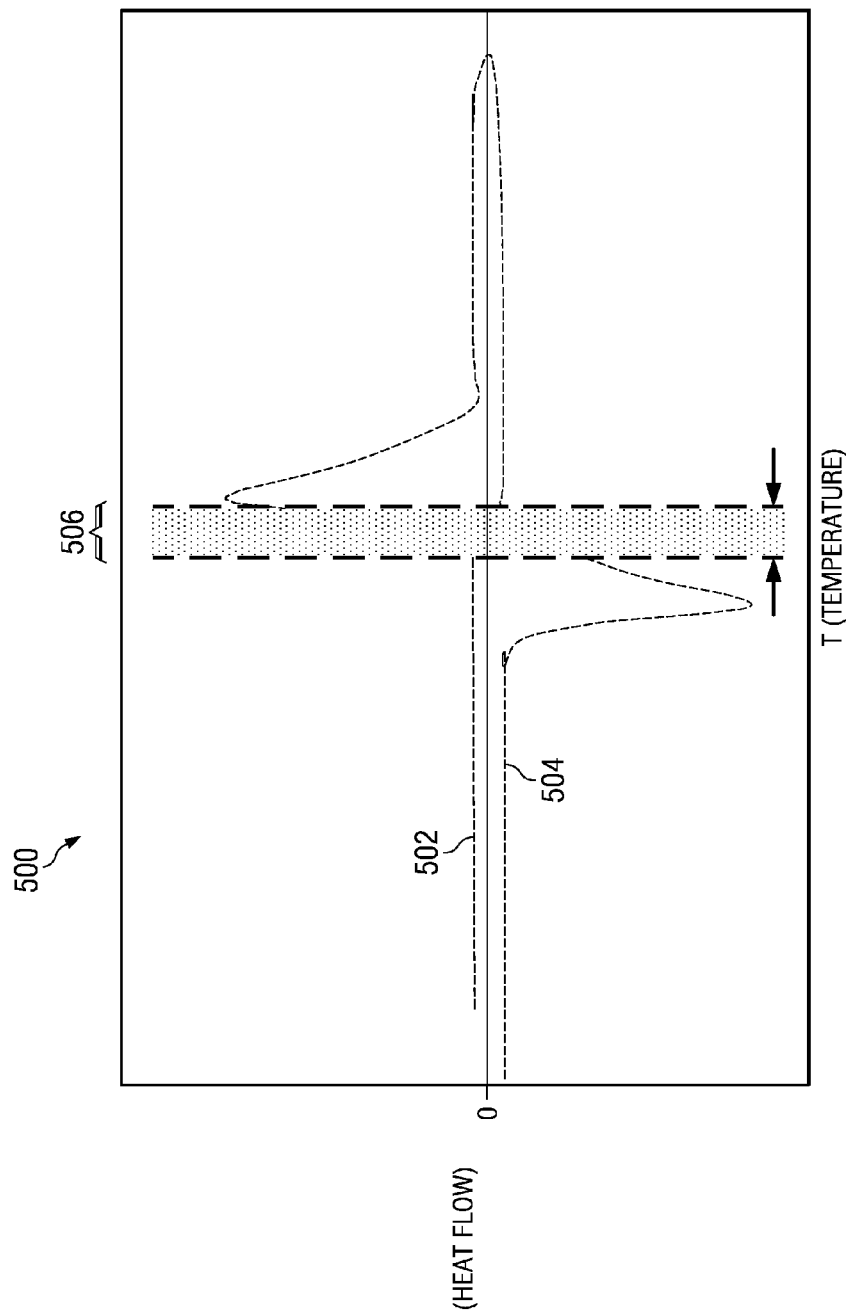
FIG. 5 is a diagram illustrating differential scanning calorimetry curves in accordance with an embodiment.

With reference to FIG. 5, a diagram illustrating differential scanning calorimetry curves is depicted in accordance with an embodiment. In graph 500, the x-axis represents temperature, while the y-axis represents heat flow. Curve 502 illustrates endothermic heat flow, while curve 504 illustrates exothermic heat curve. Curve 502 represents the heat flow for melting powder material 400 in FIG. 4, while curve 504 illustrates heat flow for re-crystallizing powder material 400 in FIG. 4. As can be seen, an overlap is present in section 506 in which powder material 400 in FIG. 4 may exist both in a powdered form and a melted form at the same temperature.

Turning back to FIG. 4, particle size distribution 410, in these examples, may be selected to increase the flow of particles. It may be desirable to allow particles to flow or move through openings created by larger particles that may be packed or stacked against each other. Further, it may be desirable to have a particle size distribution that allows for particles to flow more easily when deposited on a bed. The increased flow of particles may be desirable to obtain a more substantially smooth surface for energy delivery.

In the different embodiments, a particle size distribution of around 20 micrometers to around 150 micrometers may be used with an average particle size between around 75 micrometers and around 125 micrometers.

Particle shape 412 may be a near round and/or spherical shape. In the different embodiments, the material may be placed into a spherical shape through heat. A spherical shape may be desirable to provide better propagation of the material when powder material 400 is pushed onto a bed from a source or storage container for powder material 400. With particles that are substantially spherical, depositing particles may allow particles to settle into openings and fill voids rather than clump or cause more uneven surfaces.

Melt flow rate 414 for polymer 402 may be selected as a melt flow rate that may occur at a temperature below the temperature at which polymer 402 begins to break down. In these examples, the melt flow rate may be selected as one in which the powder material when melting and/or in liquid form may flow but does not bead up. The flow may be in a sheet-like manner. The beading may not occur by selecting a powder material that flows with a viscosity and height and surface tension that avoids beading. This type of flow may be referred to as veining. The temperature may be such that damage or a breakdown in polymer 402 does not occur at the desired melt flow rate.

Melt flow rate 414 may be selected as one in which any gas generated and/or atmospheric gas that may be present within polymer 402 during melting may exit polymer 402, while polymer 402 is in liquid form. Melt flow rate 414 also may be selected to avoid balling up to avoid clumping when manufacturing the part. In the different embodiments, a melt flow rate of around 15 grams/10 minutes to around 40 grams/10 minutes at a temperature lower than the temperature at which the polymer begins to break down may be selected for melt flow rate 414.

Figure 6:
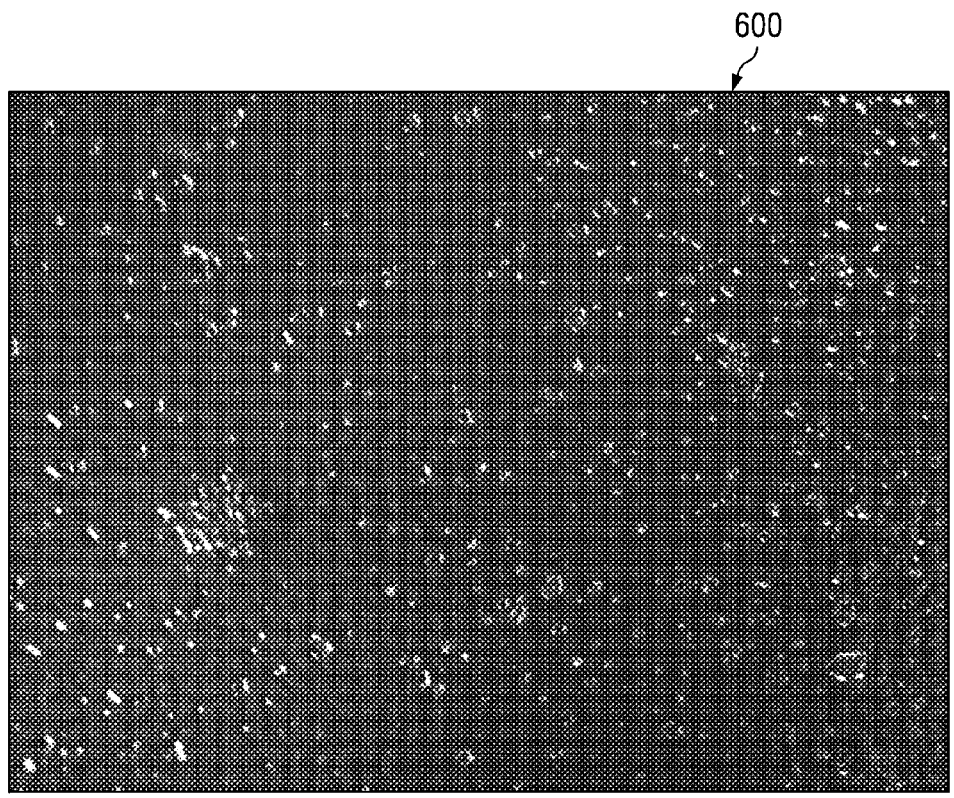
FIG. 6 is a diagram illustrating desirable melt flow in accordance with an embodiment.

Turning now to FIG. 6, a diagram illustrating desirable melt flow is depicted in accordance with an embodiment. As can be seen in this example, material 600 has a desirable melt flow in which material 600 is in a liquid form but does not form beads.

Figure 7:
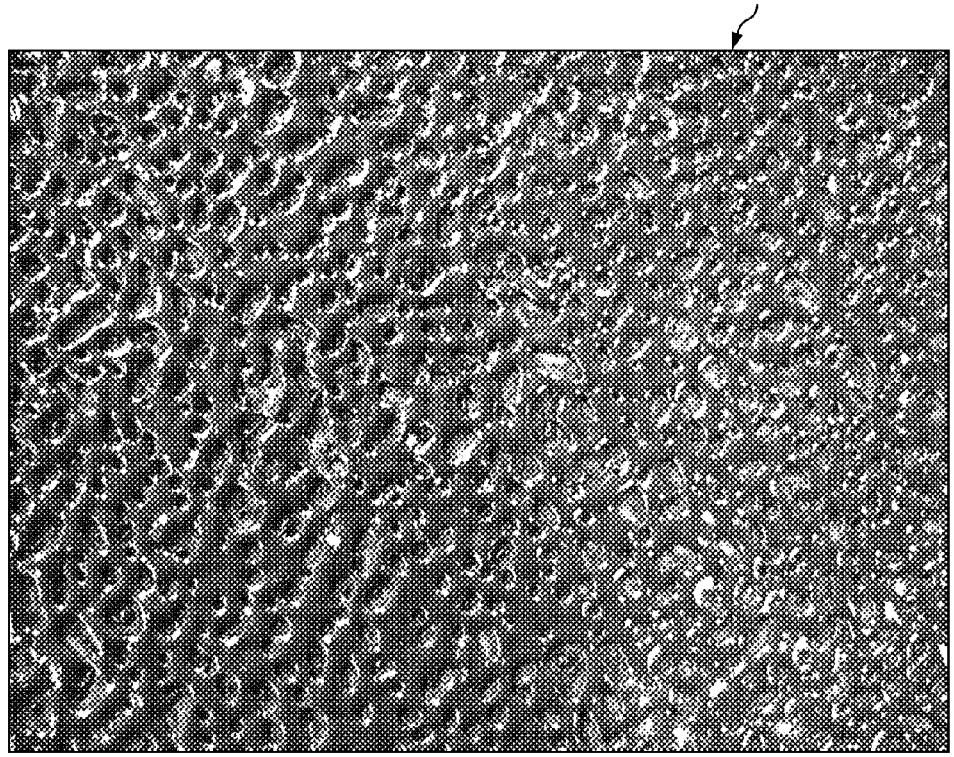
FIG. 7 is a diagram illustrating an undesirable melt flow in accordance with an embodiment.

In FIG. 7, a diagram illustrating an undesirable melt flow is depicted in accordance with an embodiment. In this example, material 700 has an undesirable melt flow in which material 600 in FIG. 6 is in a liquid form in which beading occurs.

Examples of powder materials that may be used include, for example, without limitation, a polyamide (e.g., nylon 66), polyphenylene sulfide, polyetherketoneketone, a polyamide blend, a polyphenylene sulfide blend, a polyetherketoneketone blend, and other suitable materials. Blends of the selected polymers may include blending the polymers with other powder materials. These powder materials may include, for example, without limitation, at least one of glass beads, hollow glass spheres, other polymers, minerals, clays, flame-retardant additives, color additives, and/or other suitable materials. In some aspects, when the matrix material comprises a polymer matrix chosen, but not limited to, polyetherketoneketone (PEKK), polyetheretherketone (PEEK), polyetherketone (PEK), Polyphenylene Sulfide (PPS), Polyamides (PA) or Polyphthalamides (PPA), a flame retardant (FR) additive is used. In such cases, a Bromine-containing FR, a metal oxides FR, a phosphate based FR, or other FR chemistries can be used. The FR can be as disclosed in co-assigned U.S. Published Patent Application No. 20100255327.

Examples of matrix materials are inclusive of the aforementioned polymer materials and additives, and further include metals, such as aluminum, aluminum alloys, titanium, titanium alloys, tungsten, tungsten alloys, vanadium, and vanadium alloys. In one aspect, metal matrix materials are used in combination with ceramic fibers. In other aspects, metal matrix materials are used in combination with carbon fibers and/or carbon nanofibers.

Examples of reinforcing fibers include, but are not limited to, carbon fibers, glass fibers, polymer fibers, and nanofibers. In one aspect, the fiber has a tensile modulus of over 280 MPa. In another aspect, the fiber has a tensile modulus of over 300 MPa. Other tensile modulus fibers can be used. In one aspect, the fiber diameter is between about 4 microns to about 8 micron. In another aspect, the fiber diameter is less than about 7 micron and greater than about 4 micron. In yet another aspect, the fiber diameter is between about 4.3 micron and about 5.6. As further disclosed hereafter, samples of PA 11 with carbon fibers were tested as exemplary samples merely to demonstrate the materials and methods of the instant disclosure and are not limiting of the method or choice of polymer or fiber.

The fibers of the present disclosure are of a predetermined length and/or have a predetermined L/D ratio that can be a target value for the matrix material before and/or after the powder is prepared. In one aspect, a fiber length distribution prior to processing into an AM material powder is represented by an average fiber length between 100-300 micron with less than 10% of the fibers below 10 micron or above 750 micron. In another aspect, the average fiber length is about 180 micron+/−25 micron, with less than 5% of the fibers below about 50 micron or above about 500 micron (about being +/−10%).

After selection of the fiber and fiber L/D, the fiber is extruded in combination with the material matrix, e.g., polymer using conventional compounding and extruding equipment. Extrusion can be performed to provide and/or control a predetermined fiber length. After extrusion or other intimate co-mingling of fiber and material matrix, a size reduction process is performed to provide a predetermined particle size distribution of powder (or powder particles). In one aspect, the extruded fiber comprising matrix material is subjected to an impact-based size reduction method. Such impact-based size reduction method can be performed very low temperatures, e.g., dry ice/acetone or liquid nitrogen temperature. In other aspects, a shear based size reduction can be used provided the fiber L/D can be adequately controlled to provide the target predetermined values.

The fibers, after extruding and processing, e.g., pelletizing, cryo-grinding, shaping, etc, have a smaller size distribution slightly smaller than the powder particle size distribution (PSD). In one aspect, the average fiber length (L50) in the particles is about 25 microns to about 100 microns. In another aspect, the method provides an powder particle size distribution of about 20 microns to about 300 microns with an average particle size within this distribution of about 50 microns to about 150 microns, these particles having fibers arranged essentially in a first direction where most of the fibers are oriented in the same direction relative to their longitudinal axes, these fiber having an average fiber length between about 10 micron to about 100 micron.

In one aspect, pellets without fibers can be blended together with pellets comprising the isotropically oriented fibers as described above. Blending can be performed to dilute the fiber weight percent of a "master batch" or to add additional properties to the manufactured part. Blending of the pellets can be performed using standard polymer processing equipment. Likewise blending of pellets with different average fiber L50's and/or pellets of different average particle sizes (D50's) can be performed.

Optionally, the fibers can be coated to provide various functionality, such as adhesion promotion to the matrix material, such functionality including providing chemically reactive groups bound to the fiber at one end and available for reaction with the material matrix at the other end or in-between ends. The fibers can be coated, for example, with a thermoset, thermoplastic or metal coating. In one aspect, the fibers are without any coating.

Optionally, the matrix/fiber is selected for a specific intrinsic property that may or may not be present in the fiber/matrix. For example, the matrix and/or fiber can be chosen with respect to its absorption profile of all or part of the infrared, visible, near infrared, and/or microwave spectrum of electromagnetic radiation. Thus, in one aspect, the matrix and/or fiber absorbs a substantially amount (relative to its weight percent or volume fraction) of radiation of about $0.1 \times 10^{-6}$ wavelength to about $10 \times 10^{-6}$ wavelength.

In one aspect, the fiber is obtained from previously processed material, e.g., recycled fiber. Such fiber is available by pyrolysis of reinforced materials and the like, or other recycling methods.

In another aspect, the powder of matrix material and fiber can be thermo-mechanically polished prior to use in AM processing. Such polishing can increase bulk density and dry flow characteristics of the powder and provide a finished powder suitable for use in AM processing. In one aspect, the thermo-mechanical polishing is performed using conventional methods at a temperature within about 10 degrees Centigrade to about 20 degrees Centigrade of the matrix material's glass transition temperature, as determined by DMA or DSC.

The amount of fiber used can be tailored to a predetermined mechanical property range for the manufactured part using various conventional modeling and empirical methods or modifications of such methods. In on aspect, the weight percent of fiber in the matrix material is at least 5% but less than 99%. In another aspect, the weight percent of fiber in the matrix material is between about 10% to about 75%. In yet another aspect, the weight percent of fiber in the matrix material is between about 30% to about 60%. In yet another aspect, the weight percent of fiber in the matrix material is between 30% to about 45%.

As used throughout this disclosure, the phrase "at least one of", when used with a list of items, means that different combinations of one or more of the items may be used, and only one of each item in the list may be needed. For example, "at least one of item A, item B, and item C" may include, without limitation, item A or item A and item B. This example also may include item A, item B, and item C or item B and item C.

Although the terms "first", "second", etc. may be used herein to describe various elements, components, regions, layers, fiber orientations, sections and/or parameters, these elements, components, regions, layers, sections and/or parameters should not be limited by these terms. These terms are only used to distinguish one element, component, region, layer, orientation, or section from another region, layer, orientation, or section. Thus, a first element, component, region, layer, orientation, or section discussed below could be termed a second element, component, region, layer, orientation, or section without departing from the teachings of the present disclosure.

In the different embodiments, these materials may be selected to have characteristics such as, for example, powder material 400 in FIG. 4 with a desired melting temperature range 406. In these examples, melting temperature range 406 may be desired to be around 230 degrees Celsius and above. Of course, other melting temperature ranges may be used, depending on the particular implementation.

With reference now to FIG. 8, a diagram illustrating a table of parameters for a laser sintering machine is depicted in accordance with an embodiment. In this example, table 800 provides an example of parameters that may be used to produce parts using nylon 66 as a powder material. Table 800 illustrates parameters that may be set in a selective sintering machine such as, for example, 3D Systems 2500CI Selective Sintering Machine. However, some modifications may be required to safely obtain and maintain the required processing temperatures.

When powder material 400 takes the form of nylon 66, the bed in the selective laser sintering machine may be heated to a temperature from around 190 degrees Celsius to around 260 degrees Celsius. The energy source should provide sufficient heat to increase the temperature above the melting point of the material from around 197 degrees Celsius to 265 degrees Celsius.

With reference now to FIG. 9, a diagram of a table of parameters for setting a selective sintering machine is depicted in accordance with an embodiment. Table 900 provides an example of parameters for settings in a selective sintering machine such as, for example, 3D Systems SLS Machine, as previously described.

These parameters are ones that may be used when powder material 400 takes the form of polyphenylene sulfide for use in manufacturing parts. When powder material 400 takes the form of polyphenylene sulfide, the powder in the bed may be heated from around 240 degrees Celsius to around 282 degrees Celsius. The energy applied may heat the temperature of the material above the melting point to a temperature of around 280 degrees Celsius to around 285 degrees Celsius.

With reference now to FIG. 10, a table illustrating parameters for setting a selective laser sintering system is depicted in accordance with an embodiment. Table 1000 provides an example of parameters that may be set in a selective laser sintering machine, such as 3D Systems SLS Machine. The parameters in table 1000 may be used when powder material 400 takes the form of polyetherketoneketone.

Figures 11, 13A, 14A:
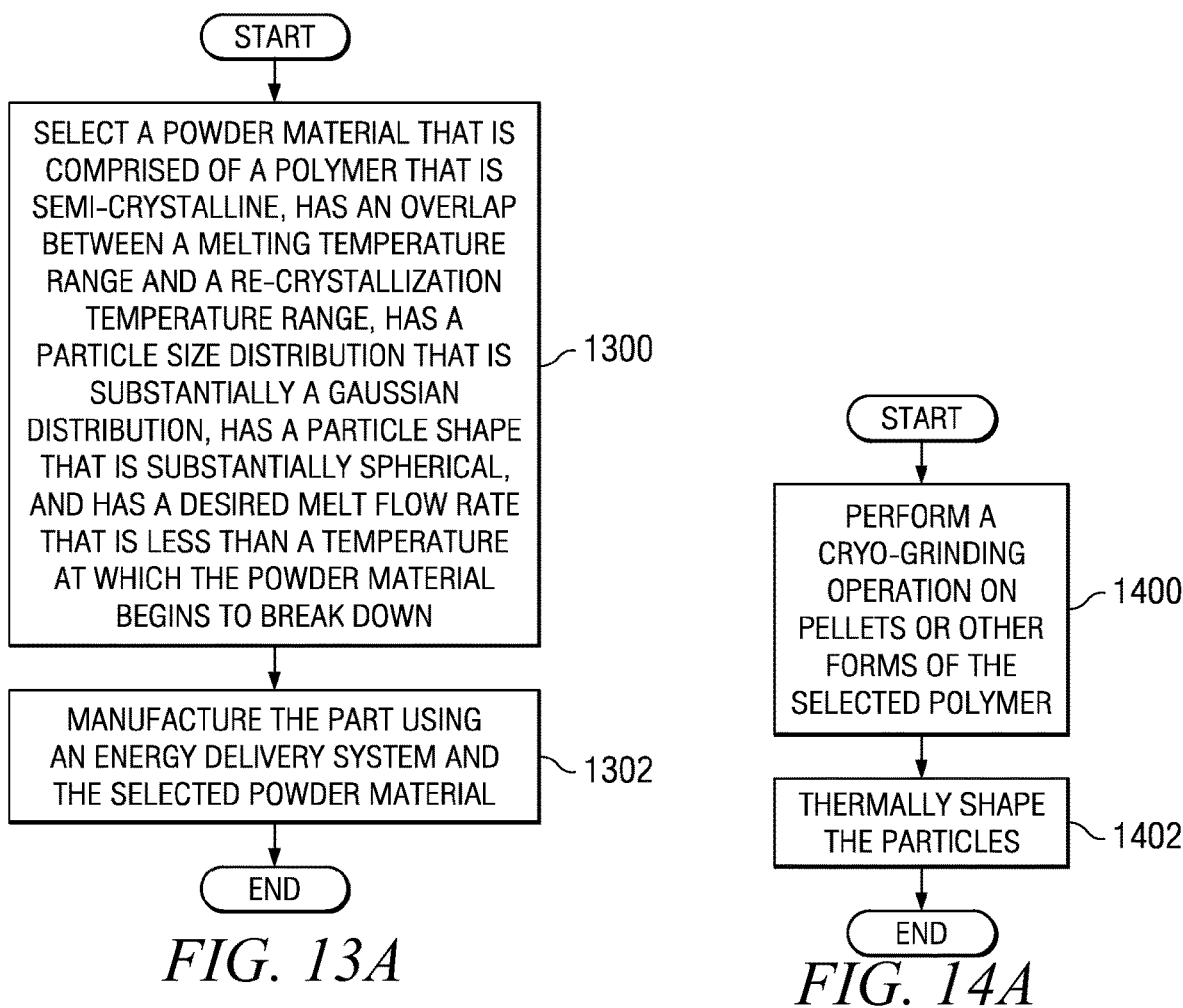
FIG. 11 is a table illustrating an illustration of mechanical properties for polymers that may be used in accordance with an embodiment.
FIG. 13A is a flowchart of a process for manufacturing parts in accordance with an embodiment.
FIG. 14A is a flowchart of a process for processing a polymer for use as a powder material in accordance with an embodiment.

With reference now to FIG. 11, a table illustrating mechanical properties for polymers that may be used is depicted in accordance with an embodiment. These mechanical properties are polymers that may be processed using selective laser sintering. In this example, table 1100 illustrates ultimate tensile tile strength, offset yield strength, elongation percentage, and melting point temperatures for a number of materials in comparison with some currently known materials.

In these examples, entries 1102, 1104, and 1106 are entries for materials selected in accordance with an embodiment. Entries 1108 and 1110 represent materials currently used for comparison purposes. Entry 1102 is for polyetherketoneketone, entry 1104 is for polyphenylene sulfide, and entry 1106 is for nylon 66. Entry 1108 is for nylon 12, while entry 1110 is for nylon 11.

As can be seen, the melting points for polyetherketoneketone, polyphenylene sulfide, and nylon 66 are significantly higher as compared to nylon 12 and nylon 11. Nylon 12 has a melting point temperature of around 187 degrees Celsius, while nylon 11 has a melting point temperature of around 186 degrees Celsius. Nylon 66 has a melting temperature of around 254 degrees Celsius, polyphenylene sulfide has a melting point of around 280 degrees Celsius, and polyetherketoneketone has a melting point of around 310 degrees Celsius. In addition to having higher melting points, these different materials also may have the desired mechanical properties for constructing aircraft parts.

Figure 12:
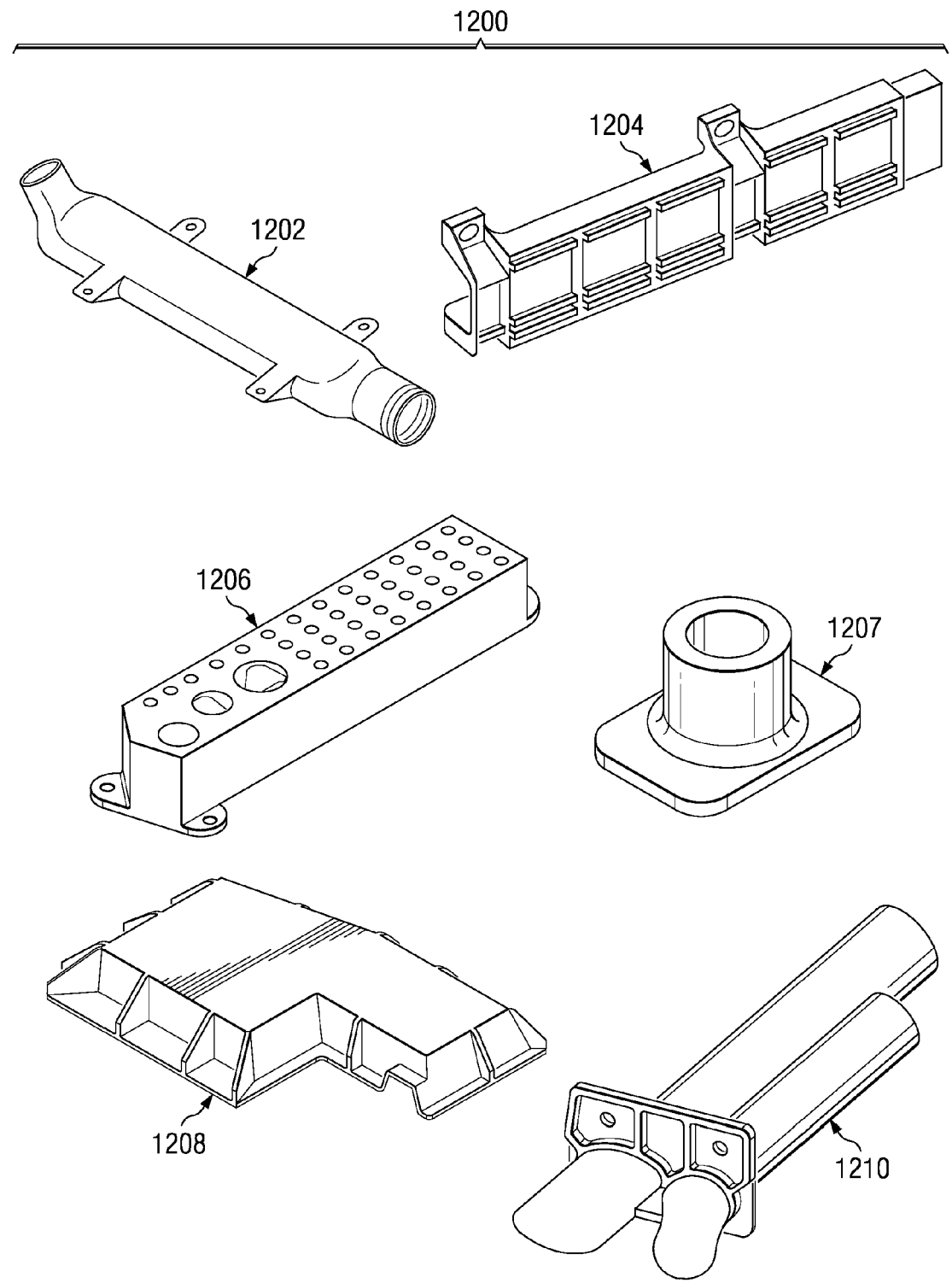
FIG. 12 is a diagram illustrating parts that may be manufactured using polymers in accordance with an embodiment.

With reference now to FIG. 12, a diagram illustrating parts that may be manufactured using polymers is depicted in accordance with an embodiment. In these examples, parts

1200 are example parts that may be manufactured using powder material 400 in FIG. 4. Parts 1200 include duct 1202, electrical shroud 1204, power distribution panel 1206, fitting 1207, closure 1208, conduit 1210, and other suitable aircraft parts. Many other types of parts, other than these illustrative ones, may be manufactured using polymers and powder materials for selective laser sintering processes in accordance with an embodiment.

With reference now to FIG. 13A, a flowchart of a process for manufacturing parts is depicted in accordance with an embodiment. The process illustrated in FIG. 13A may be implemented in a manufacturing environment such as, for example, manufacturing environment 300 in FIG. 3. In these illustrative examples, the process may begin by selecting a powder material that is comprised of a polymer that is semi-crystalline, has an overlap between a melting temperature range and a re-crystallization temperature range, has a particle size distribution that is substantially a Gaussian distribution, a particle shape that is substantially spherical, and has a desired melt flow rate at temperature less than that at which the powder material begins to chemically break down (operation 1300). In one aspect, the desired melt flow rate, measured at a temperature less than at which the powder material begins to chemically break down, is greater than zero.

A polymer can chemically break down when the polymer is heated, such that the chains in the polymer begin to fall apart. In particular, a long chain that is a high-strength chain in the polymer may fall apart into subscale chains called monomers. The chemical breakdown also may result in the polymer breaking down into constituent components and molecules. In other words, the polymer chemically breaks down when the structure of the polymer begins to fall apart. The process then manufactures the part using an energy delivery system and the selected powder material (operation 1302), with the process terminating thereafter.

With reference now to FIG. 14A, a flowchart of a process for processing a polymer for use as a powder material is depicted in accordance with an embodiment. In these examples, the process illustrated in FIG. 14A may be used to manufacture a powder material such as, for example, powder material 316 for use in manufacturing part 304 in manufacturing environment 300 in FIG. 3.

The process may begin by performing a cryo-grinding operation on pellets or other forms of the selected polymer (operation 1400). In these illustrative examples, cryo-grinding may be performed by cooling the polymer stock to cryogenic temperatures to induce fracture rather than tearing of the material. The cryo-grinding operation may be performed to fracture the material in a manner that prevents heat generation and building of molecular weight within the polymer.

This polymer stock may take various forms. For example, the polymer stock may be in the form of pellets, beads, strips, or some other suitable form. The grinding operation is set to produce a predetermined shape and size. The resulting particles may be either air or screen classified to obtain the correct particle distribution. Particles that are larger than the accepted range are removed, cooled, and reground. The particles that are too small for the specified particle range are removed and discarded.

The particles can then be thermally shaped (operation 1402) or used as is. Operation 1402 can be performed, for example, by passing heated air through a column or a bed of powder at a temperature such that the particles may become spherodized by contact. The process terminates thereafter.

Figures 13B, 14B:
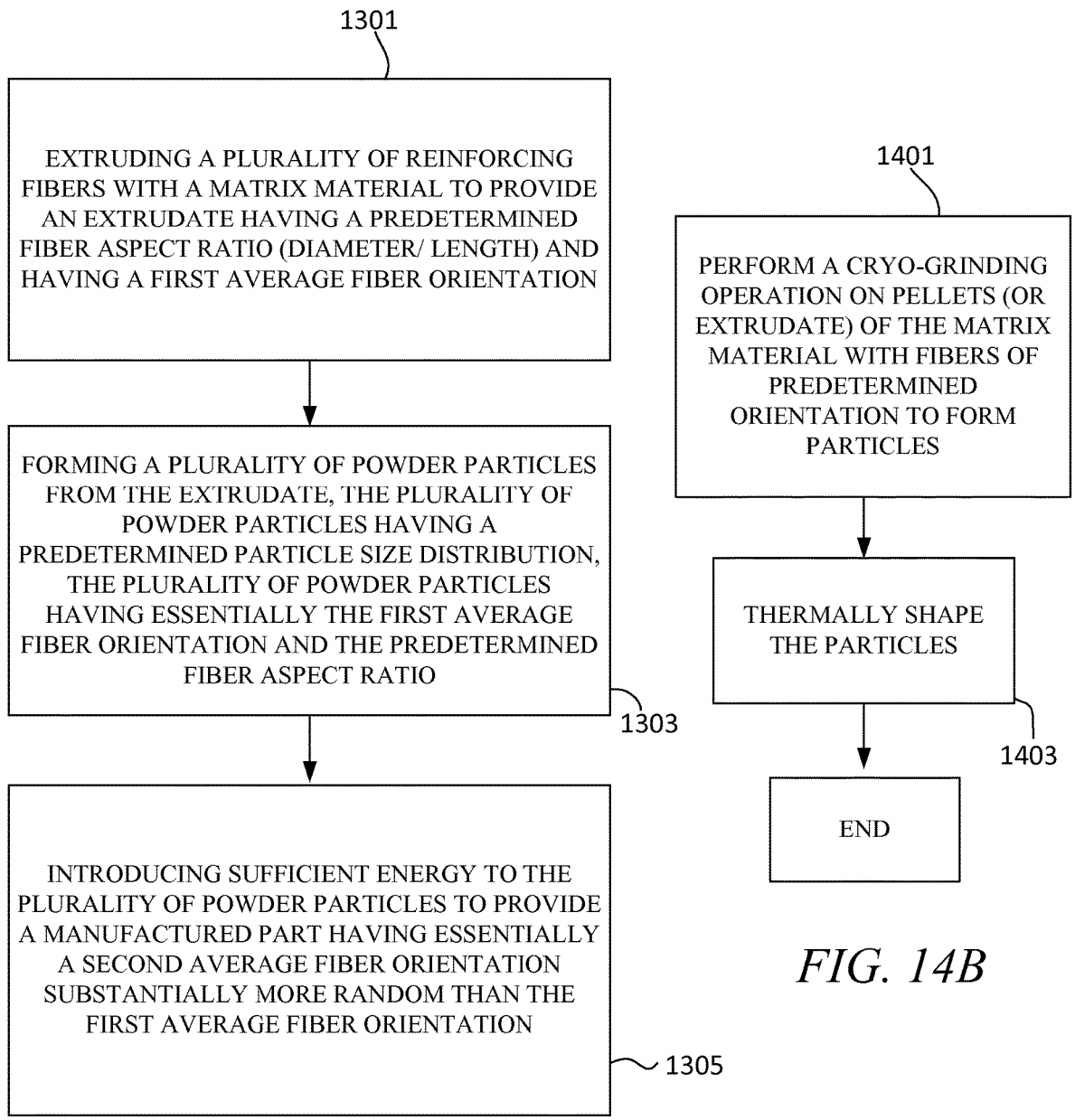
FIG. 13B is a flowchart of an alternate process for manufacturing parts in accordance with an embodiment.
FIG. 14B is a flowchart of a process for processing a matrix material with fiber of predetermined orientation for use as a powder material in accordance with an embodiment.

With reference now to FIG. 13B, a flowchart of an alternate process for manufacturing parts is depicted in accordance with an embodiment comprising a matrix material and a plurality of reinforcing fibers of predetermined orientation. The process illustrated in FIG. 13B may be implemented in a manufacturing environment such as, for example, manufacturing environment 300 in FIG. 3. In these illustrative examples, the process may begin by extruding a plurality of reinforcing fibers with a matrix material to provide an extrudate having a predetermined fiber aspect ratio (diameter/length) and having a first average fiber orientation (operation 1301). In operation 1303, the process includes forming a plurality of powder particles from the extrudate, the plurality of powder particles having a predetermined particle size distribution, each of the plurality of powder particles having essentially the first average fiber orientation and the predetermined fiber aspect ratio. In operation 1305, the process includes introducing sufficient energy to the plurality of powder particles, e.g., directed energy, to provide a manufactured part having essentially a second average fiber orientation and the predetermined fiber aspect ratio in the matrix material.

With reference now to FIG. 14B, a flowchart of an alternate process that can be employed in conjunction with that depicted in FIG. 13B, for processing a matrix material comprising reinforcing fibers with a predetermined orientation for use as a powder material, is depicted in accordance with an embodiment. In these examples, the process illustrated in FIG. 14B may be used to manufacture a fiber-reinforced powder material use in manufacturing part 304 in manufacturing environment 300 in FIG. 3.

The process may begin by performing a cryo-grinding operation on pellets or other forms of the selected matrix material (operation 1401). In these illustrative examples, cryo-grinding may be performed by cooling the matrix material to cryogenic temperatures to induce fracture rather than tearing of the material. The cryo-grinding operation may be performed to fracture the matrix material in a manner that prevents heat generation and detrimental effects to the matrix material and prevents further dimensional change to the reinforcing fibers or their relative orientation within the matrix material such that a free-flowing powder can be obtained.

The matrix material can be in the form of pellets, aggregate, beads, strips, or some other suitable form. The grinding operation is set to produce a predetermined shape and size. The resulting particles may be either air or screen classified to obtain a desired particle distribution. Particles that are larger than the accepted range can be removed, cooled, and reground. The particles that are too small for the specified particle range can be removed and discarded.

The particles comprising, individually, a predetermined orientation distribution of one or more fibers can then be thermally shaped (operation 1403) or used as is. Operation 1403 can be performed, for example, by passing heated air through a column or a bed of powder at a temperature such that the particles may become spherodized by contact. The process terminates thereafter.

Figure 15:
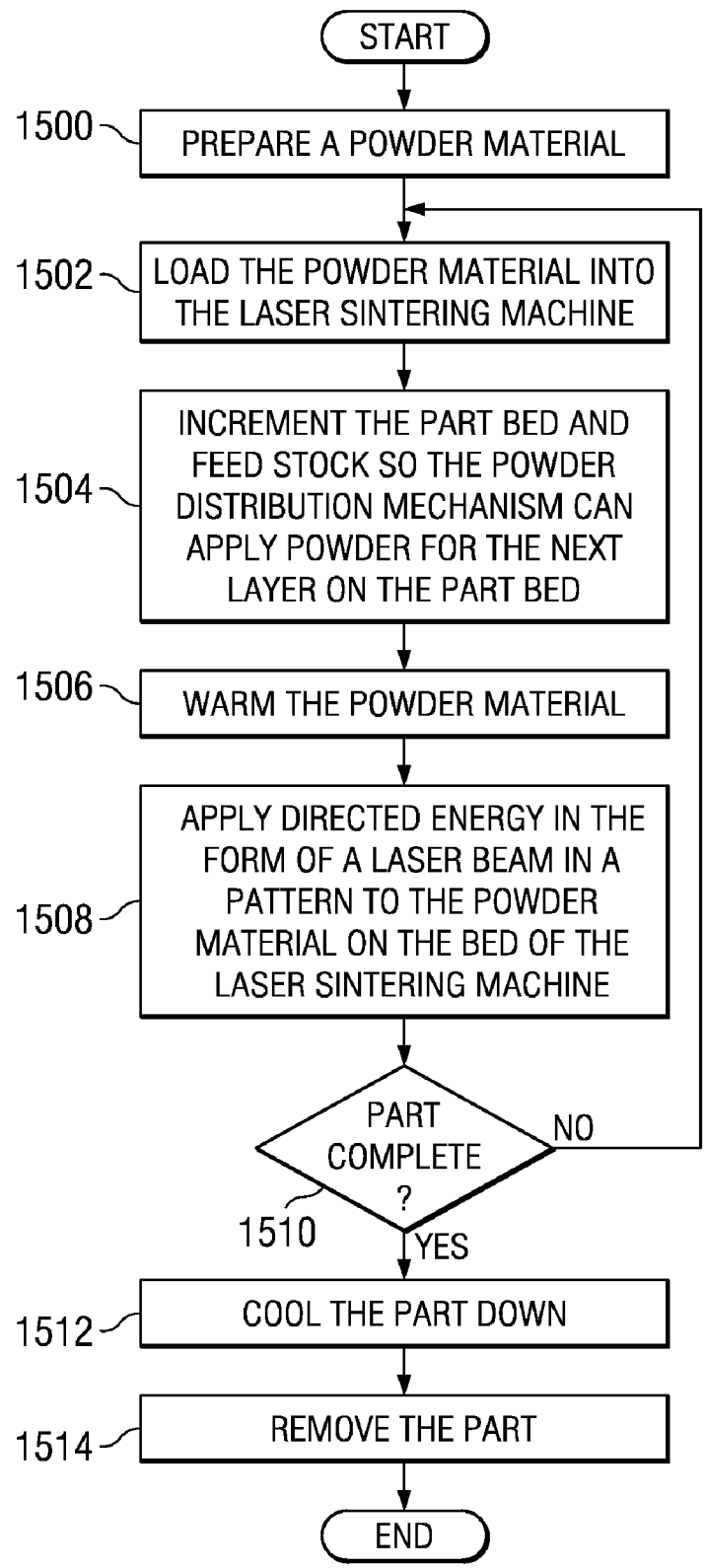
FIG. 15 is a flowchart of a process for manufacturing a part in accordance with an embodiment.

With reference now to FIG. 15, a flowchart of a process for manufacturing a part is depicted in accordance with one or more embodiments. The process illustrated in FIG. 15 may be implemented in manufacturing environment 300 in FIG. 3. The process begins by preparing a powder material (operation 1500), which could be a matrix material with reinforcing fiber of a predetermined orientation. Operation 1500 can include determining the fiber orientation of the fibers in the matrix material and selecting, rejecting, and/or blending matrix material of specific characteristics or ranges of characteristics, such characteristics including for example fiber orientation distribution, fiber aspect ratio, fiber weight or volume percent per particle, and the like. The process loads the powder material into the laser sintering machine (operation 1502). The process then increments the part bed and the powder in feed stock to allow the powder distribution mechanism to apply powder for the next layer on the part bed (operation 1504).

The process may then warm the powder material (operation 1506). The warming of the powder material may occur prior to the powder being placed onto the bed of the laser sintering machine. The warming of the powder material may continue while the powder material is on the bed of the laser sintering machine. In other words, the powder material may be pre-warmed. In other embodiments, the powder material may not be warmed until placed onto the bed in the laser sintering machine.

The thermoplastic portion of the powder material requires sufficient energy to melt and flow. An example of methods to provide that energy is by using directed energy, e.g. laser, microwave, x-ray, IR or others. In one example, directed energy in the form of a laser beam may be applied in a pattern to the powder material on the bed (operation 1508). The application of the laser beam in a pattern onto the powder material may melt and/or sinter the powder material into a liquid and/or molten form. This processing of the powder material may form at least a portion of the part.

A determination may be made as to whether the part is complete (operation 1510). In some cases, the part may require a single pass of the laser beam. In other embodiments, additional passes may be required to complete the part, depending on the geometry and size of the part. If the part is not complete, the process returns to operation 1502 as described above. Operation 1510 can also include determining the fiber orientation of the part or the fiber orientation distribution function as further discussed and described below.

If the part is complete, the process then cools the part down (operation 1512), the part is removed (operation 1514), with the process terminating thereafter.

The flowcharts and block diagrams in the different depicted embodiments illustrate the architecture, functionality, and operation of some possible implementations of apparatus and methods for manufacturing parts, objects, and/or products. In this regard, each block in the flowchart or block diagrams may represent a module, segment, step, operation, or a portion thereof for implementing a specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different embodiments may provide a method and apparatus for manufacturing parts. At least some of the different embodiments may provide a capability to manufacture parts having a capability to operate at higher temperatures and/or lighter weight than currently available parts manufactured using a directed energy system. In the different embodiments, polymers may be selected having one or more characteristics providing a capability to manufacture a part using a directed energy system, such as a laser beam in a laser sintering machine. Further, the part also may have the desired mechanical characteristics that may be maintained during use of the part.

The different embodiments may be especially useful with manufacturing parts for use in aircraft. As discussed above, the different embodiments may provide parts capable of operating at temperatures above around 100 degrees Celsius to around 280 degrees Celsius. Further, although the different illustrative examples may be used to create parts for these temperatures, one or more of the different embodiments also may be used to create parts for other temperature ranges.

In this manner, by selecting polymer characteristics and manufacturing polymers with the identified characteristics, the different embodiments may use these selectively laser sintered polymers in place of metals that may normally be used for parts used at temperatures of around 200 degrees Celsius and above.

Experimental Section

Examples of matrix materials comprising reinforcing fibers are now provided. The average fiber direction of material, e.g., pellets, and the resultant cryo-ground fiber-containing pellets, e.g., as a powder can be determined using existing instrumentation and methods. The exemplary test samples were polyamide polymer matrix materials containing carbon fibers, however, the technique is valid for other matrix materials, such as metals, and for other fibers, such as glass, ceramic, carbon, or nanofibers, and can be used with other additives, so long as there is a density difference between the fibers and the matrix containing the fibers. Thus, fiber direction of glass/inorganic fiber in a plastic matrix, as well as ceramic or carbon fiber in a metal matrix can be determined.

Three exemplary samples were prepared and tested and their fiber orientation parameters, e.g., main direction and orientation distribution function determined. These samples represent the operations depicted in FIGS. 13B and 14B. Sample S1 and S2 were pellet structures comprising fibers as described above as in FIG. 13B. Sample S3 was a powder material of pellets containing fibers that was cryo-ground to provide a free flowing powder suitable for use in a SLS device for additive manufacturing, as in FIG. 14B.

Each of the different samples were introduced into a Skyscan 1172 machine (Skyscan; Kontich, Beligum) and computed tomographic (CT) scans were taken with a resolution of about 800 nm. CT scanning results were imported into Mimics software (Materialise; Leuven, Belgium). Segmentation was performed to extract the different density fibers out of the scan for each sample. A 3D object was generated and the center-lines of the fibers calculated. These center-lines were used to calculate a main fiber orientation and relative fiber directions. For each sample, a fiber orientation (F) was calculated and a main fiber direction (D) calculated. The main direction was presented as a vector in a 3-D plot (x,y,z) of normalized fiber direction. The main direction vector essentially corresponds to the largest eigenvalue, which correlates with the average fiber orientation direction in the sample. Thus, a pellet, aggregate, powder, or manufactured part can be analyzed, and the relative average fiber orientation determined. This allows for fiber incorporation process optimization and structure-property correlation of, for example SLS manufactured parts, made from powders derived from pellets with predetermined fiber orientations.

The first pellet sample (S1) comprising between 30-45 weight percent carbon fibers in a polyamide 11 polymer matrix, provided the following fiber orientation value D1, and main fiber direction F1, which is summarized in Tables A and B, respectively:

TABLE A

Normalized Main Fiber Direction of Sample S1.

| 4.38 | 0.00 | 0.00 |
|------|------|------|
| 0.00 | 1.19 | 0.00 |
| 0.00 | 0.00 | 1.00 |

TABLE B

Normalized Fiber Orientation valves of Sample S1.

| 1.00 | 101.29 | −112.68 |
|------|--------|---------|
| 12.00 | 112.27 | 101.03 |
| 151.03 | −9.59 | −7.29 |

Figure 16A:
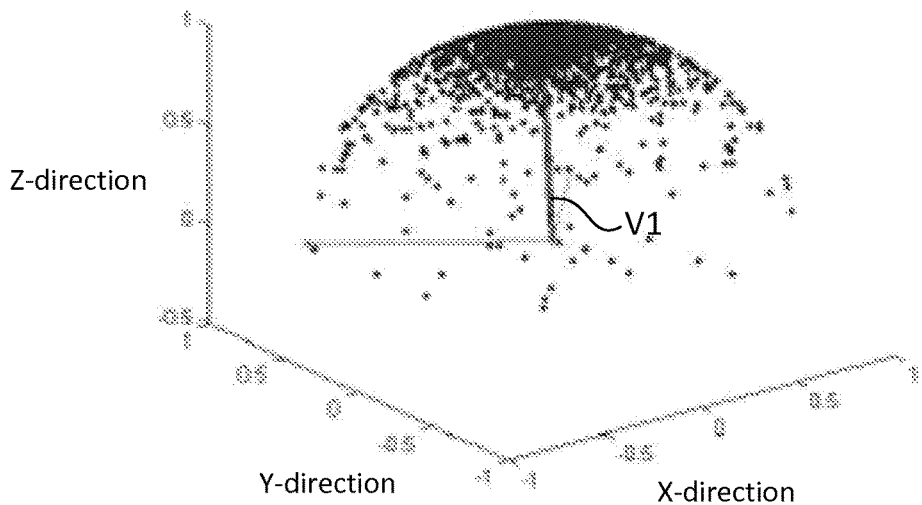
FIGS. 16A, 16B, 16C, 16D and 16E are diagrams representing normalized fiber direction in three dimensions and individual dimensions, respectively, of an extruded pellet in accordance with an embodiment.
Figure 16B:
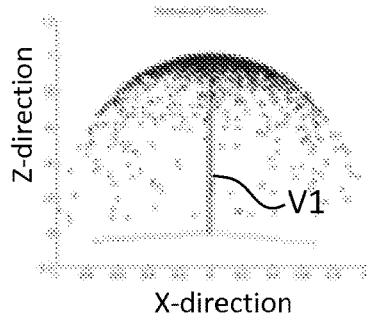
Figure 16C:
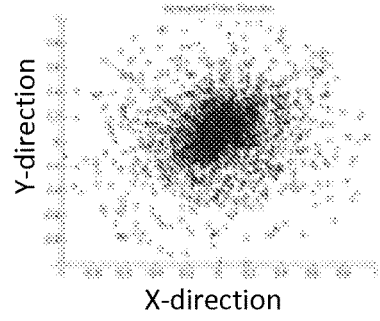
Figure 16D:
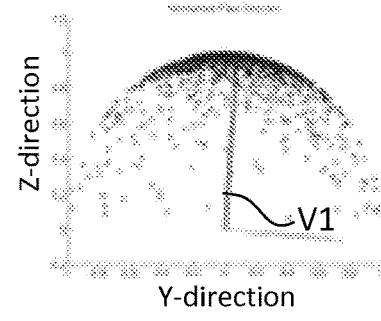

As can be seen in FIGS. 16A for Sample S1, there is a preferential fiber direction V1 (main direction) in this pellet sample as demonstrated by the larger eigenvalue in one direction (vector eigenvalues) relative to the other directions and represented in the 3D graph of normalized fiber direction verses the Cartesian coordinates x, y, and z. FIGS. 16B, 16C, and 16D represent the normalized fiber direction in 2D space, e.g., via pairs of Cartesian coordinates, (z,x), (y,x), and (z,y), respectively, of the data presented in FIG. 16A.

Figure 16E:
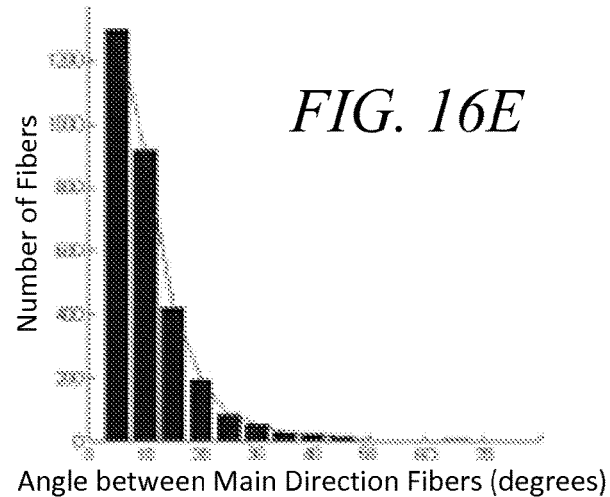

From the data of FIG. 16A, the angle of essentially every fiber detected in the sample can be plotted in a histogram represented by FIG. 16E, which provides an orientation distribution function for sample S1. As can be seen, a significant proportion of the fibers of sample S1 are isotropically aligned in a first direction with the main direction, for example, have an average angle between the main direction of less than about 30 degrees.

The second pellet sample (S2) comprising between 30-45 weight percent carbon fibers in a polyamide 11 matrix polymer matrix provided the following normalized fiber orientation value D2, and main fiber direction F2, which is summarized in Tables C and D, respectively:

TABLE C

Normalized Main Fiber Direction of Sample S2.

| 4.89 | 0 | 0 |
|------|---|---|
| 0 | 1.15 | 0 |
| 0 | 0 | 1.00 |

TABLE D

Normalized Fiber Orientation valves of Sample S2.

| −4.11 | −27.36 | −35.29 |
|-------|--------|--------|
| −1.00 | −35.37 | 27.54 |
| −44.64 | 3.31 | 2.63 |

Figure 17A:
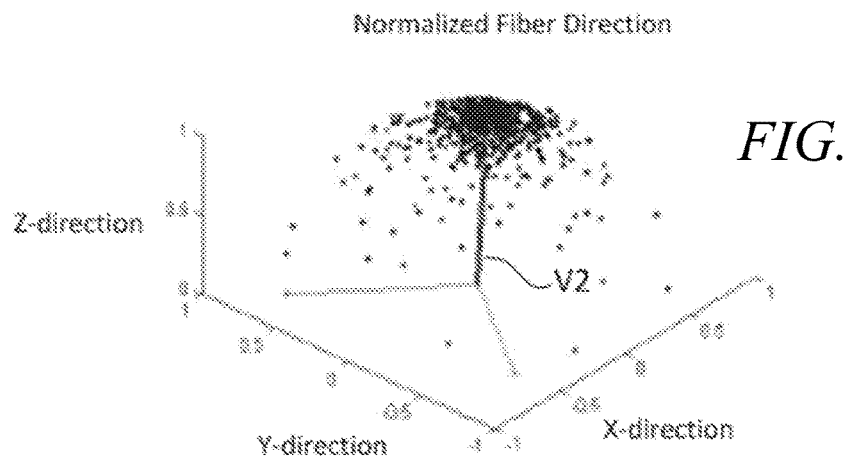
FIGS. 17A, 17B, 17C, 17D and 17E are diagrams representing normalized fiber direction in three dimensions and individual dimensions, respectively, of an extruded pellet in accordance with an embodiment.
Figure 17B:
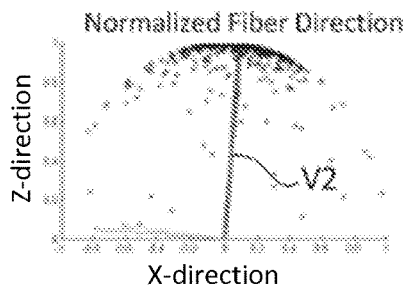
Figure 17C:
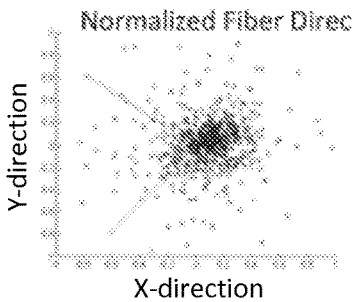
Figure 17D:
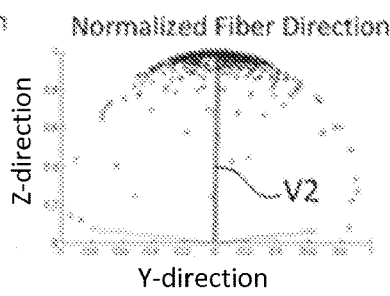

As can be seen in FIGS. 17A for Sample S2, there is a preferential fiber direction V2 (main direction) in this pellet sample as demonstrated by the larger eigenvalue in one direction (vector eigenvalues) relative to the other directions and represented in the 3D graph of normalized fiber direction verses the Cartesian coordinates x, y, and z. FIGS. 17B, 17C, and 17D represent the normalized fiber direction in 2D space, e.g., via pairs of Cartesian coordinates, (z,x), (y,x), and (z,y), respectively, of the data presented in FIG. 17A.

Figure 17E:
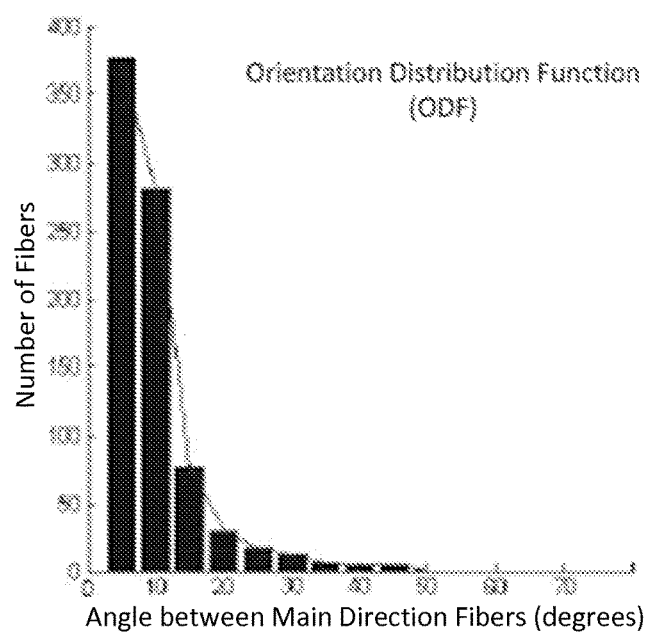

From the data of FIG. 17A, the angle of essentially every fiber detected in the sample was plotted in a histogram represented by FIG. 17E, which provided an orientation distribution function for sample S2. As can be seen, a significant proportion of the fibers of sample S2 are isotropically aligned in a first direction with the main direction, for example, have an average angle between the main direction of less than about 30 degrees.

The powder sample (P1) of similar composition provided the following fiber orientation value D3, and main fiber direction F3, which is summarized in Tables E and F, respectively:

TABLE E

Normalized Main Fiber Direction of Sample P1.

| 1.33 | 0.00 | 0.00 |
|------|------|------|
| 0.00 | 1.13 | 0.00 |
| 0.00 | 0.00 | 1.00 |

TABLE F

Normalized Fiber Orientation valves of Sample P1.

| −1.00 | −16.54 | −8.58 |
|-------|--------|-------|
| 6.97 | −8.30 | 15.18 |
| −17.28 | −2.39 | 6.63 |

As can be seen in FIGS. 18A for Sample P1, there is a less pronounced preferential fiber direction V3 (main direction) in this powder sample as demonstrated by the smaller eigenvalue difference in one direction (vector eigenvalues) relative to the other directions and represented in the 3D graph of normalized fiber direction verses the Cartesian coordinates x, y, and z. FIGS. 18B, 18C, and 18D represent the normalized fiber direction in 2D space, e.g., via pairs of Cartesian coordinates, (z,x), (y,x), and (z,y), respectively, of the data presented in FIG. 18A.

From the data of FIG. 18A, the angle of essentially every fiber detected in the sample was plotted in a histogram represented by FIG. 18E, which provided an orientation distribution function for sample P1. As can be seen, the fibers of sample P1 are aligned with the main direction in a second direction (or second directions) that is considerably more anisotropic than the first direction of either pellet samples S1 or S2, for example, having an angle between the main direction that extends out beyond 60 degrees and has more of a Gaussian shape than that of the pellet samples. SLS processing of such powder samples provides for substantially anisotropic fiber orientation in the manufactured part, and with it, improved, anisotropic properties to part.

Figure 19:
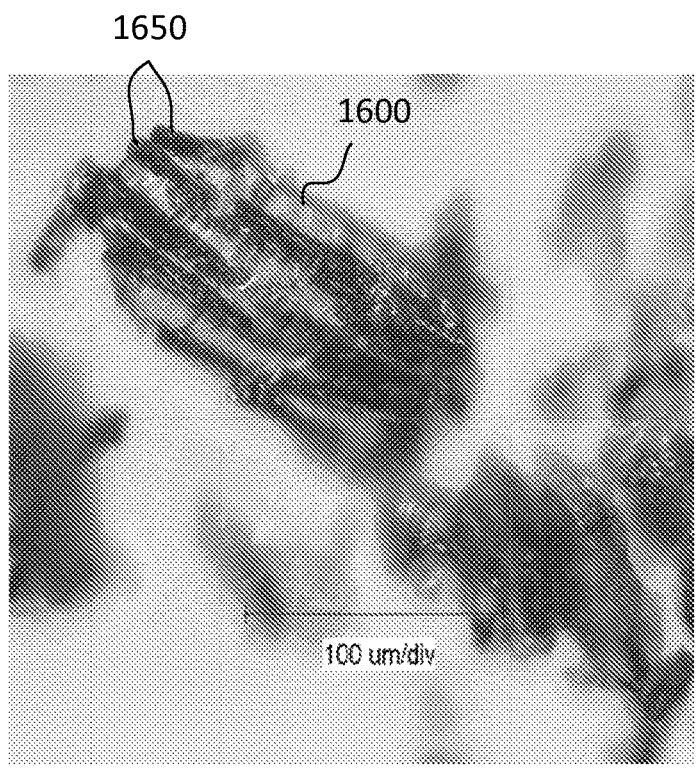
FIG. 19 is a digital image of an scanning electron micrograph (SEM) of a powder particle in accordance with an embodiment.
Figure 20:
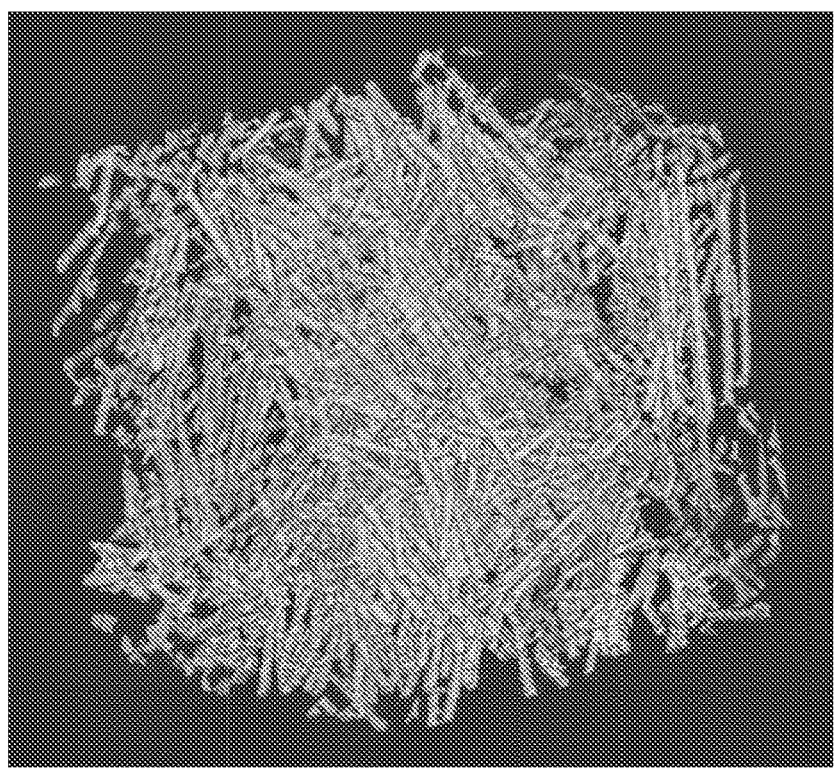
FIG. 20 is a digital image of a computer-aided topography scan (CT scan) of a manufactured part in accordance with an embodiment.

FIG. 19 depicts a SEM image of powder comprising matrix material 1600 with fibers 1650 having a predetermined L/D and length distribution and clearly showing the fibers arranged in a substantially isotropic orientation, e.g., fibers substantially oriented in a first direction. FIG. 20 shows a digital image of a CT scan of a manufactured sample with the fiber contrasting the matrix material. A generally anisotropic arrangement of fibers are clearly visible in FIG. 20.

Figure 21:
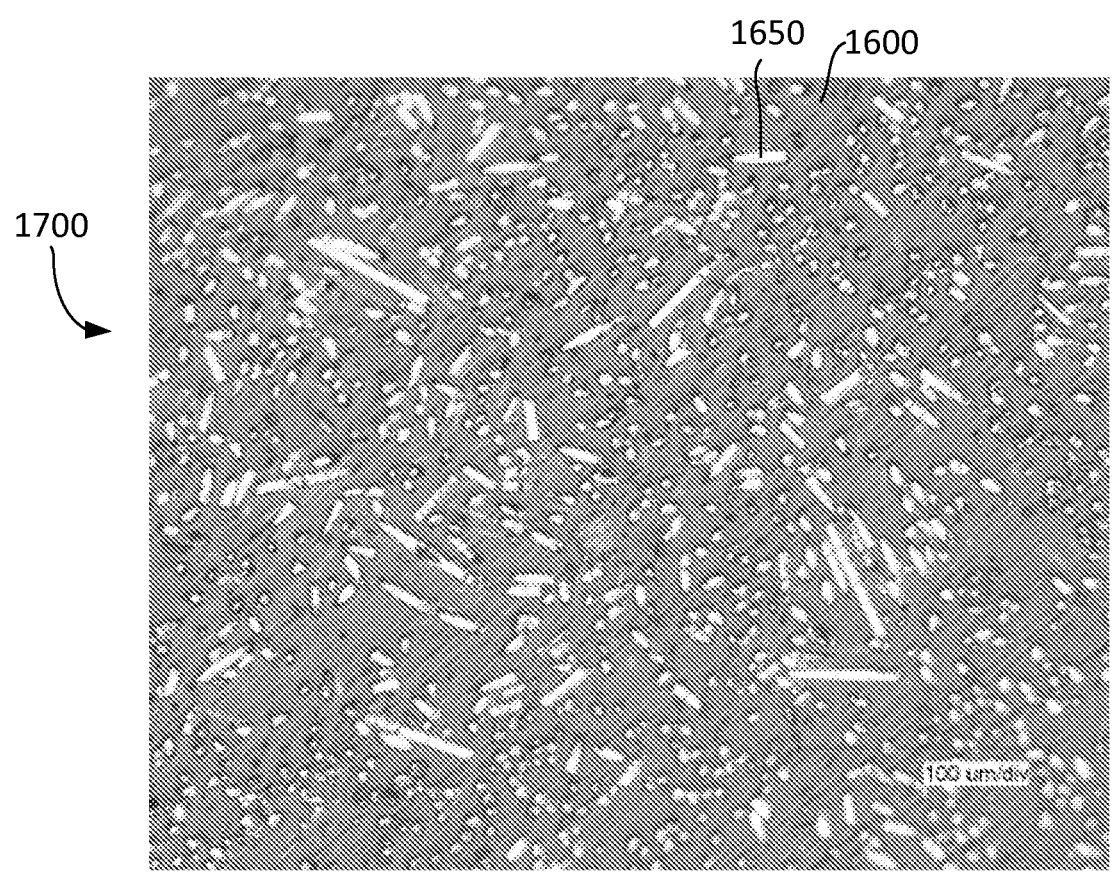
FIG. 21 is a digital image of an scanning electron micrograph (SEM) of a SLS manufactured part in accordance with an embodiment.

FIG. 21 depicts an optical magnified image of a portion of SLS manufactured part 1700, clearly showing fiber 1650 with a substantially anisotropic orientation in matrix material 1600, e.g., fibers oriented in a substantially random direction. Manufactured part 1700 exhibits improved, anisotropic mechanical properties as a result of the present method.

Figure 22:
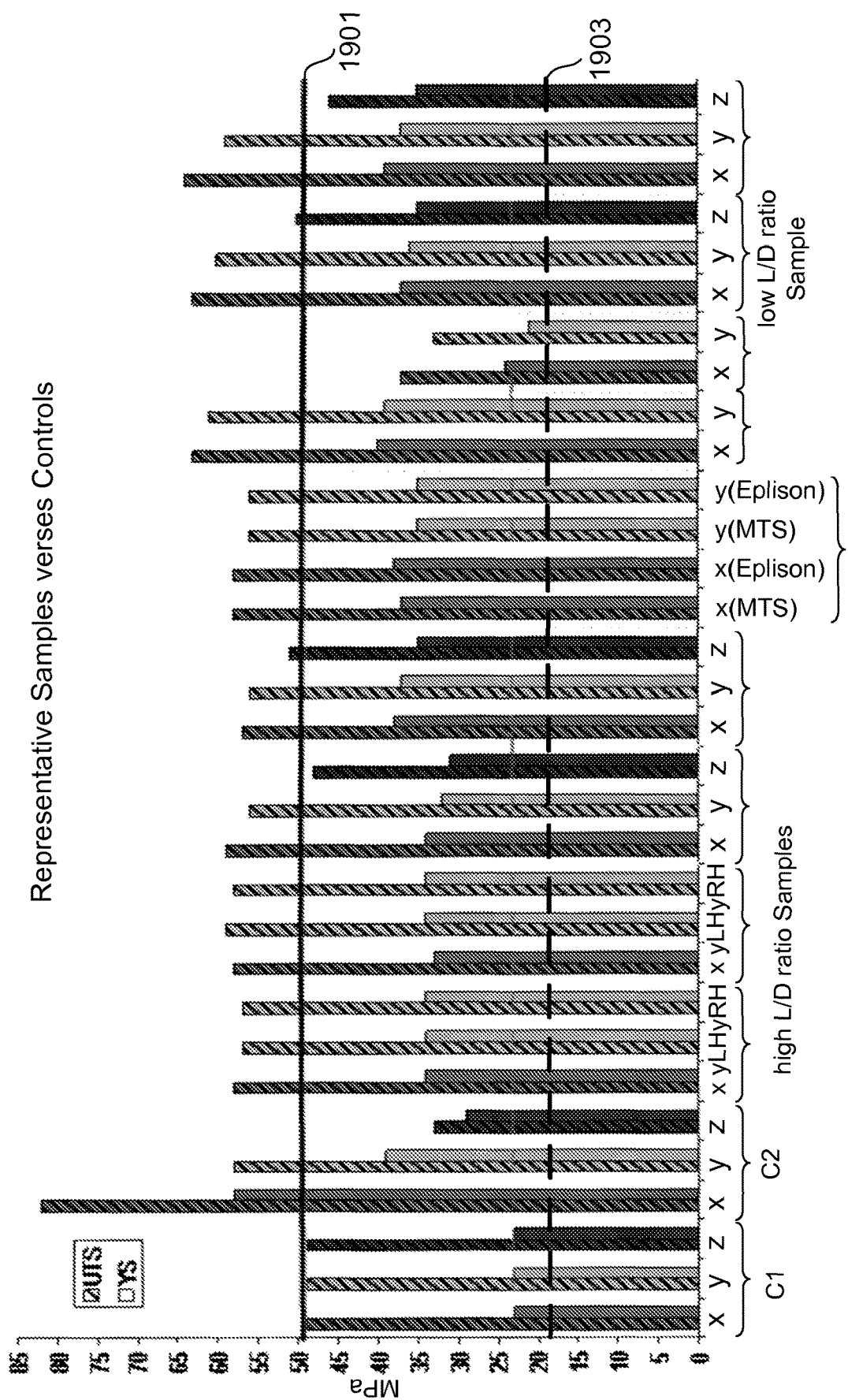
FIG. 22 depicts ultimate tensile strength and yield strength data of manufactured parts verses controls in accordance with an embodiment.

FIG. 22 is a bar graph providing ultimate tensile strength (UTS) and yield strength (YS) data determined along the x, y, and z axes of the specimen for controls C1 (polyamide 11 without reinforcing fiber), C2 (CARBONMIDE®, a polyamide 12 with reinforcing carbon fiber (EOS, Germany)) and sample materials disclosed herein is provided. Samples of the instant disclosure included polyamide 11 with fiber weight percents between about 30 to about 50 weight percent, carbon fibers of lengths between about 100 mm to about 200 mm, fiber diameter of about 4 to about 8 micron, with or without flame retardant. Recycled fibers were also used.

In FIG. 22, the UTS (shown along line 1901) and YS (shown along line 1903) of polyamide 11 without reinforcing fiber (C1) is essentially anisotropic as tested along the x, y, z axis of the specimen. In contrast, C2 displays significant isotropic mechanical properties as demonstrated by the difference in both UTS and YS along the x, y, and the z axis of the test specimen, notably with UTS properties significantly less than C1 in certain directions. Samples prepared in accordance with the instant disclosure however, showed significantly improved anisotropic mechanical properties as shown in the UTS and YS measured along the x,y, z or the x,y axes of the test specimens. Clearly, samples having a low L/D ratio of fiber at about 35 weight percent loading had more uniform UTS and YS along the x, y, and z axis. While the maximum UTS and YS was lower, the low L/D sample exhibited improved anisotropic mechanical performance attributes, have equivalent properties in at least one direction with that of CARBONMIDE, thus providing a material with enhanced design capabilities. Samples comprising recycled carbon fibers exhibited excellent anisotropic mechanical properties. Similar results are observed for additional samples. Representative sample comprising a higher L/D ratio with about 35 weight percent fiber again showed significantly anisotropic UTS and YS along the x, y, and z axis with slightly higher UTS and YS than sample.

Figure 23:
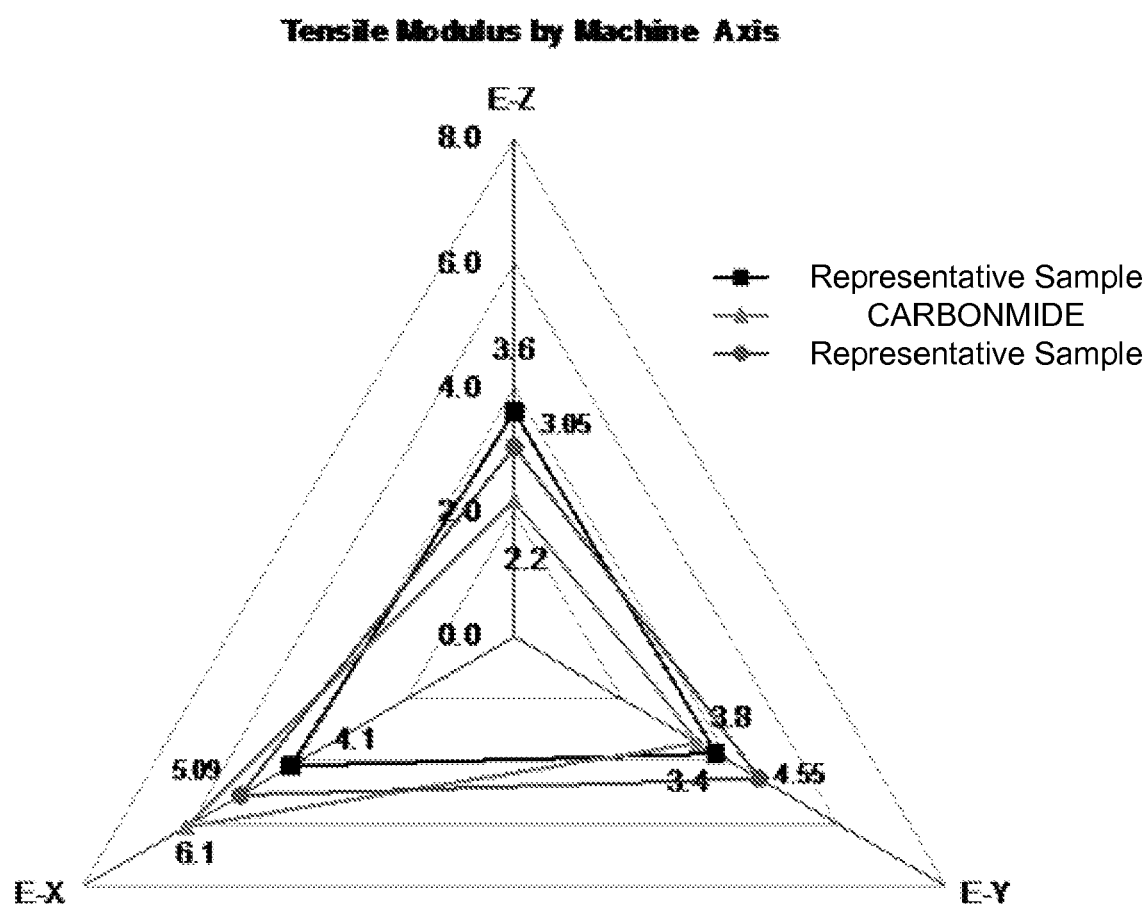
FIG. 23 depicts tensile modulus data of manufactured parts verses controls in accordance with an embodiment.

FIG. 23 shows the tensile Modulus in each of the three machine axes for representative samples prepared as disclosed here (representative samples, corresponding to samples comprising polyamide 11 with fiber weight percents between about 30 to about 50 weight percent, carbon fibers of lengths between about 100 mm to about 200 mm and fiber diameters between 4 to 8 microns, with and without flame retardant) compared to polyamide without reinforcing fibers and CARBONMIDE as controls. As shown in FIG. 23, the representative samples demonstrate more anisotropic mechanical properties than CARBONMIDE.

Figure 24:
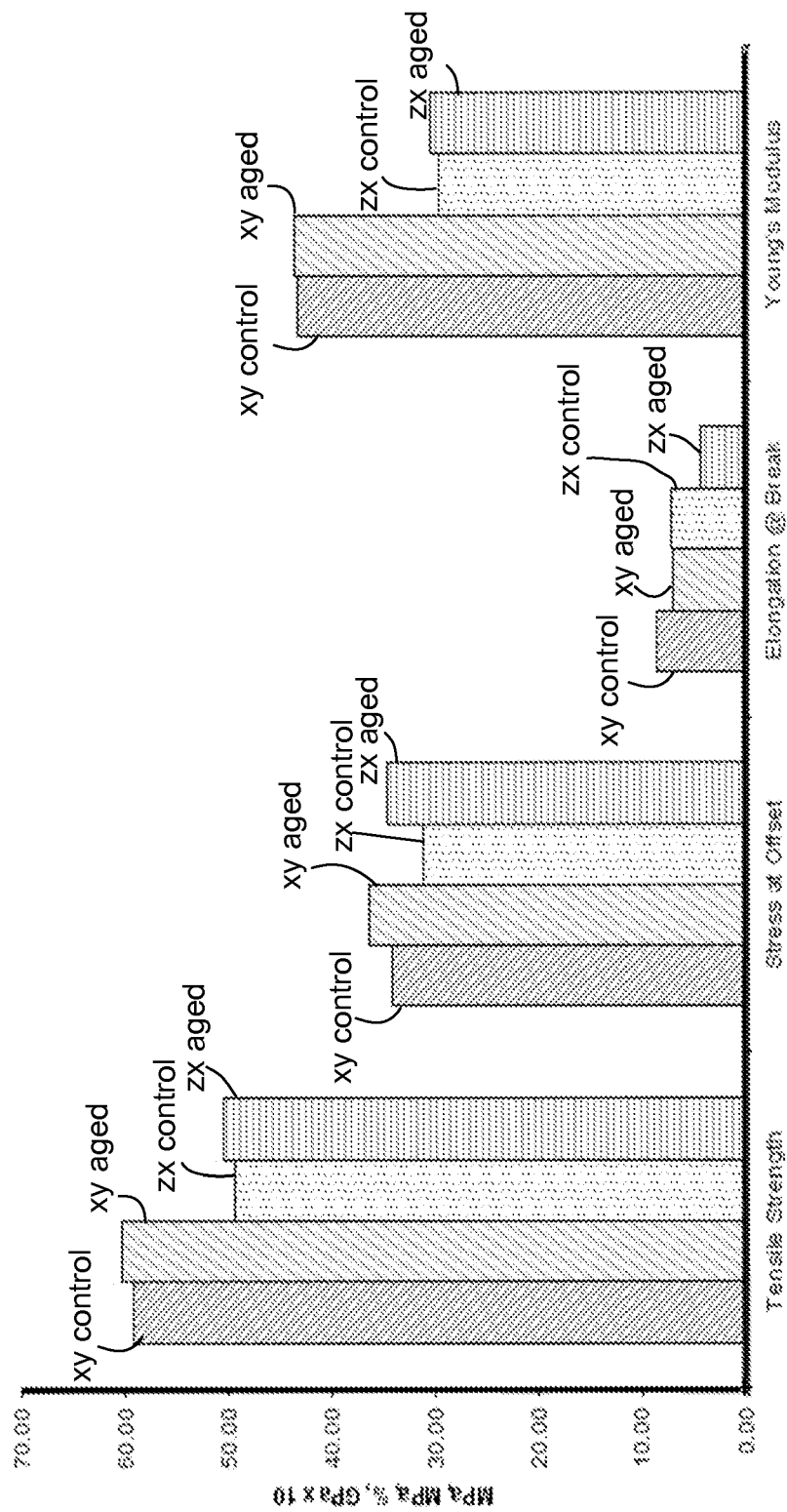
FIG. 24 depicts UV resistance data of manufactured parts verses controls in accordance with an embodiment.

FIG. 24 depicts ultraviolet (UV) resistance of certain samples as measured by retention of mechanical properties measured in various machine directions (xy and zx) for representative samples disclosed herein. FIG. 24 shows that the methods and materials disclosed herein provide UV resistant manufactured parts, with minimal UV degradation of mechanical properties.

Figure 25:
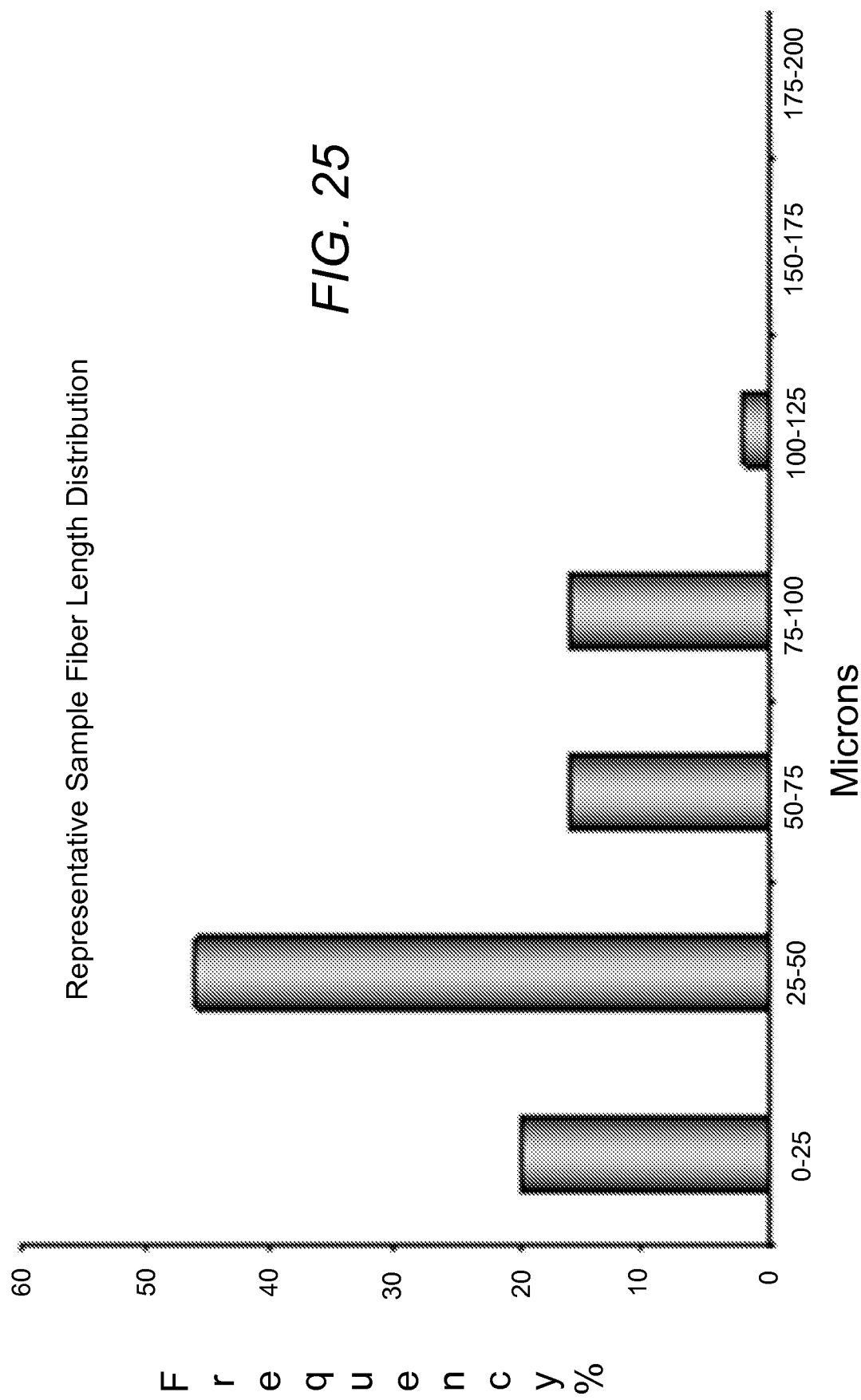
FIG. 25 depicts fiber length distribution data of a powder in accordance with an embodiment.

FIG. 25 depicts the fiber length distribution of a representative sample after cryo-grinding of the extruded matrix material (PA 11) and reinforcing fiber (carbon). FIG. 25 shows about a 45 percent frequency of fibers around 25-50 microns in length and a distribution of fiber length of around 0 to about 125 microns.

Figure 26:
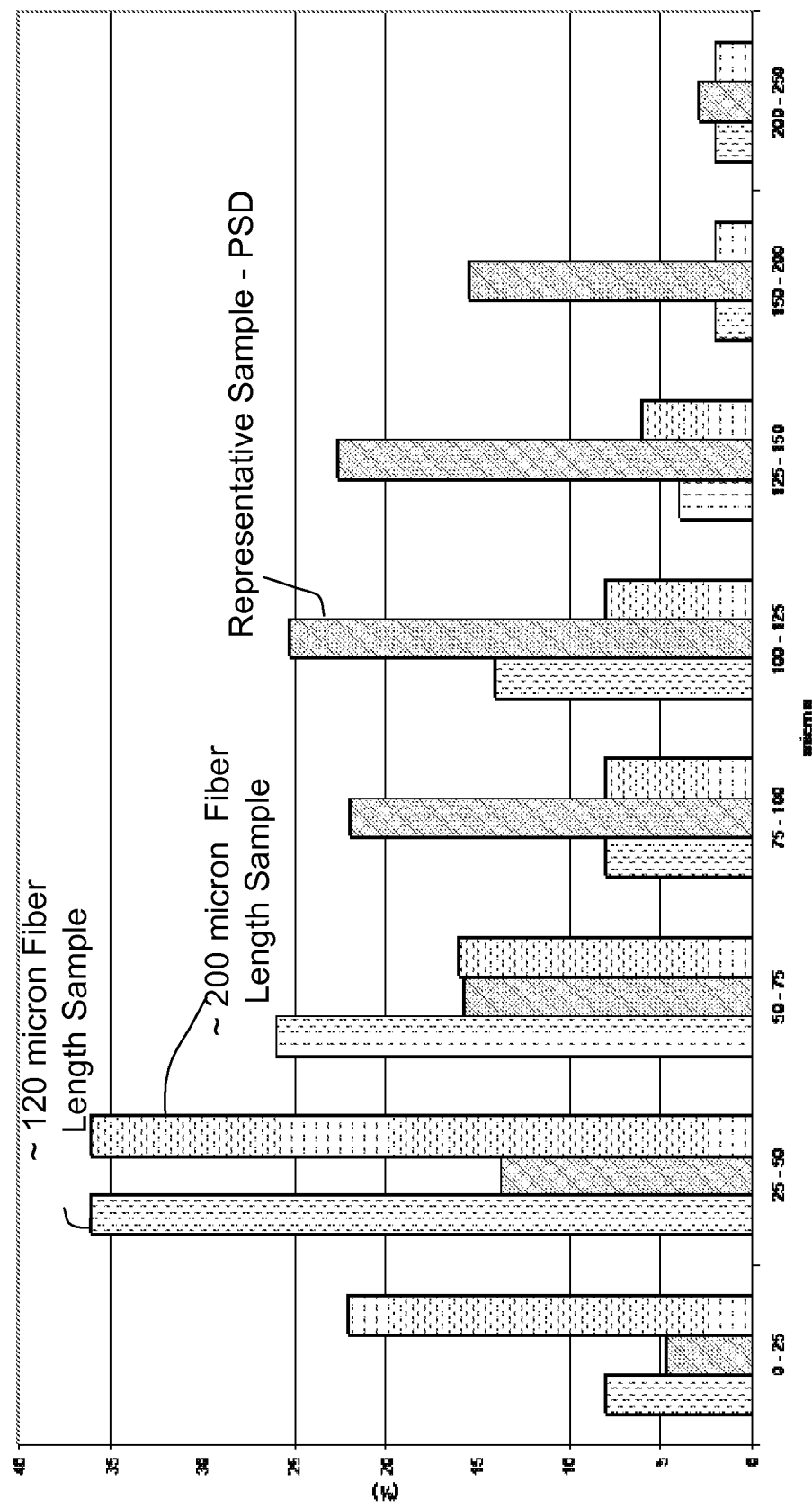
FIG. 26 depicts fiber length distribution and particle size distribution data of a powder in accordance with an embodiment.

FIG. 26 depicts the influence of input fiber length (going into the compounding/extruding process) on the resulting powder material fiber length for a representative sampling comprising materials prepared by methods disclosed herein. Thus, as shown in FIG. 26, the fiber length distribution of the fibers in representative samples having similar weight percentages and type of fiber, are show along with the particle size distribution (PSD) for powder made from a representative sample. As can be seen the PSD of the powder is configured to accommodate the fiber length distribution to provide a free-flowing powder particle (e.g., with minimal projecting or exposed fibers, etc).

Figure 27:
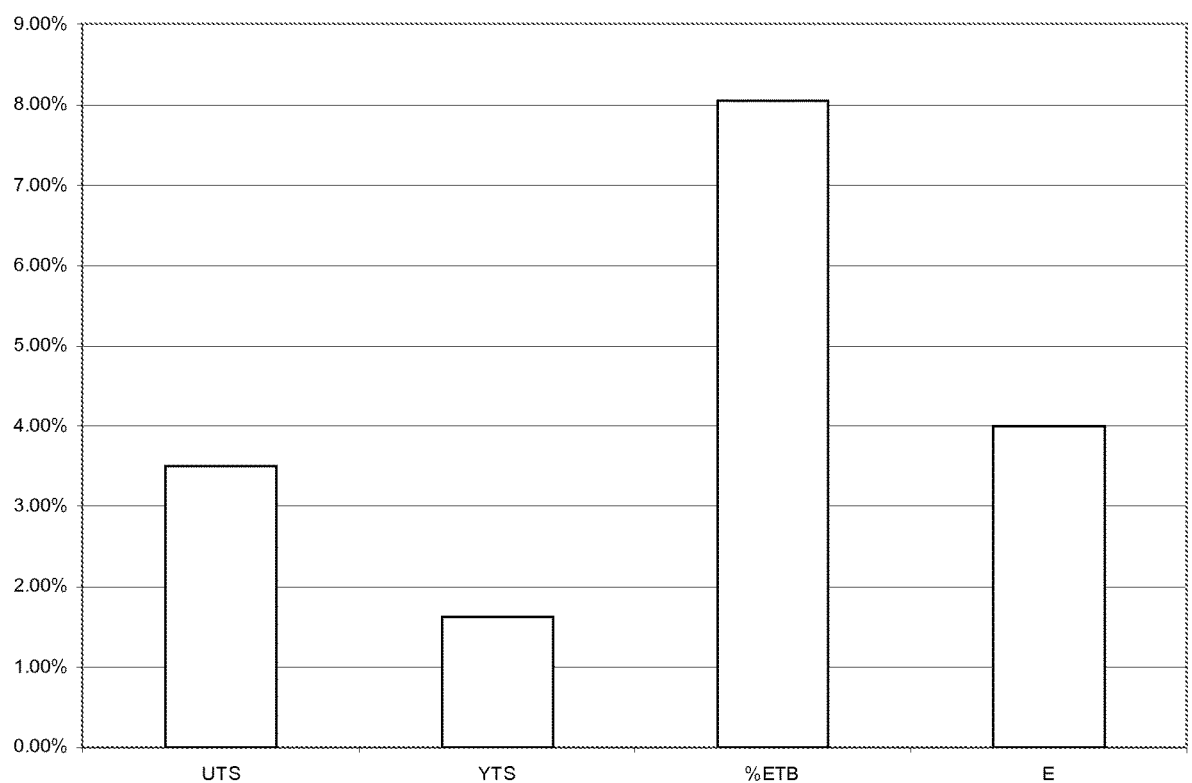
FIG. 27 depicts average mechanical property improvement data of manufactured parts with certain additives in accordance with an embodiment.

FIG. 27 depicts an improvement of mechanical properties of the materials and methods disclosed herein by the addition of fused silica (e.g., CABOSIL; Cabot Inc., Billerica, Mass.) to the matrix material after compounding. Thus, ultimate tensile strength (UTS), yield tensile strength (YTS), percent elongation to break (% ETB) and tensile modulus (E), were improved over the same matrix/fiber composition without fused silica.

In addition, surface roughness, measured on a Mitutoyo SJ-400 profilometer, 8 mm measurement, 3 measurements per sample, improved in the materials disclosed herein at a level of about 0.05 to about 0.15 weight percent, for a 0.07 weight percent loading of CABOSIL as well as with polishing methods. An average of 37 percent improvement in surface roughness using CABOSIL and about 25 percent improvement in roughness with polishing was observed. The choice of fiber also contributed to improving the surface roughness. In addition, adding conventional flame retardant provided about 43 percent improvement in roughness.

The materials and methods disclosed also provided a manufactured part with excellent vertical burn properties. Thus, with about 7 weight percent of flame retardant, 30 weight percent carbon fiber, a polyamide matrix material passed the 12 and 60 second vertical burn tests with only some edge defects observed, indicating the materials and methods disclosed herein suitable for use as parts subject to stringent flame testing requirements.

Figure 28:
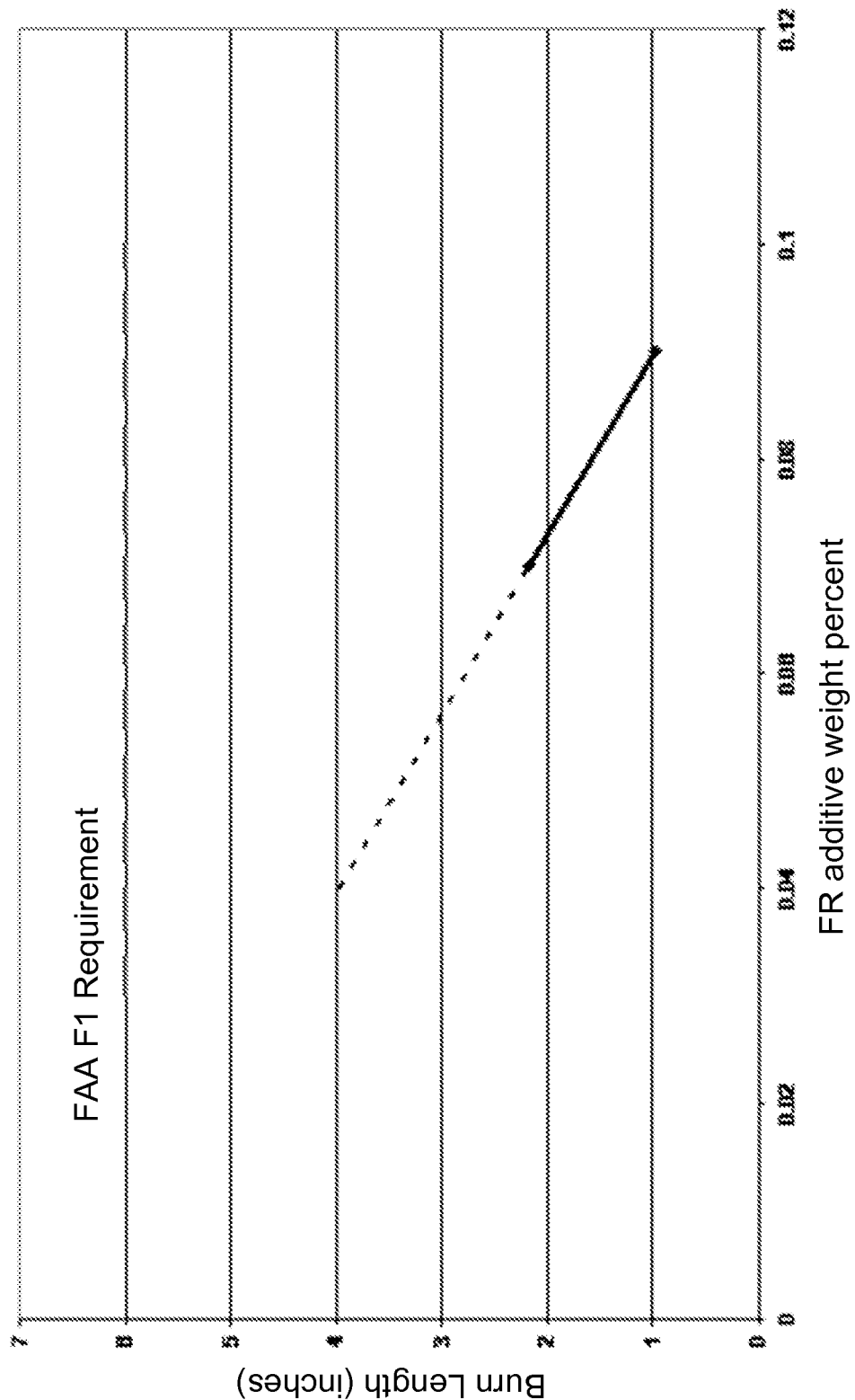
FIG. 28 depicts burn length testing data of manufactured parts in accordance with an embodiment.

FIG. 28 demonstrates the materials and methods herein disclosed also provided manufactured parts with excellent flame resistance. Thus, with about 7 and about 9 weight percent of flame retardant (FR), 30 weight percent carbon fiber, the polyamide matrix material passed the Federal Aviation Standards F1 flame test a part thickness of 0.04 and 0.125 inches. The data of FIG. 28 shows that the level of flame retardant can likely be reduced significantly as indicated by the linear extrapolation of FR additive to the F1 test requirement.

Figure 29:
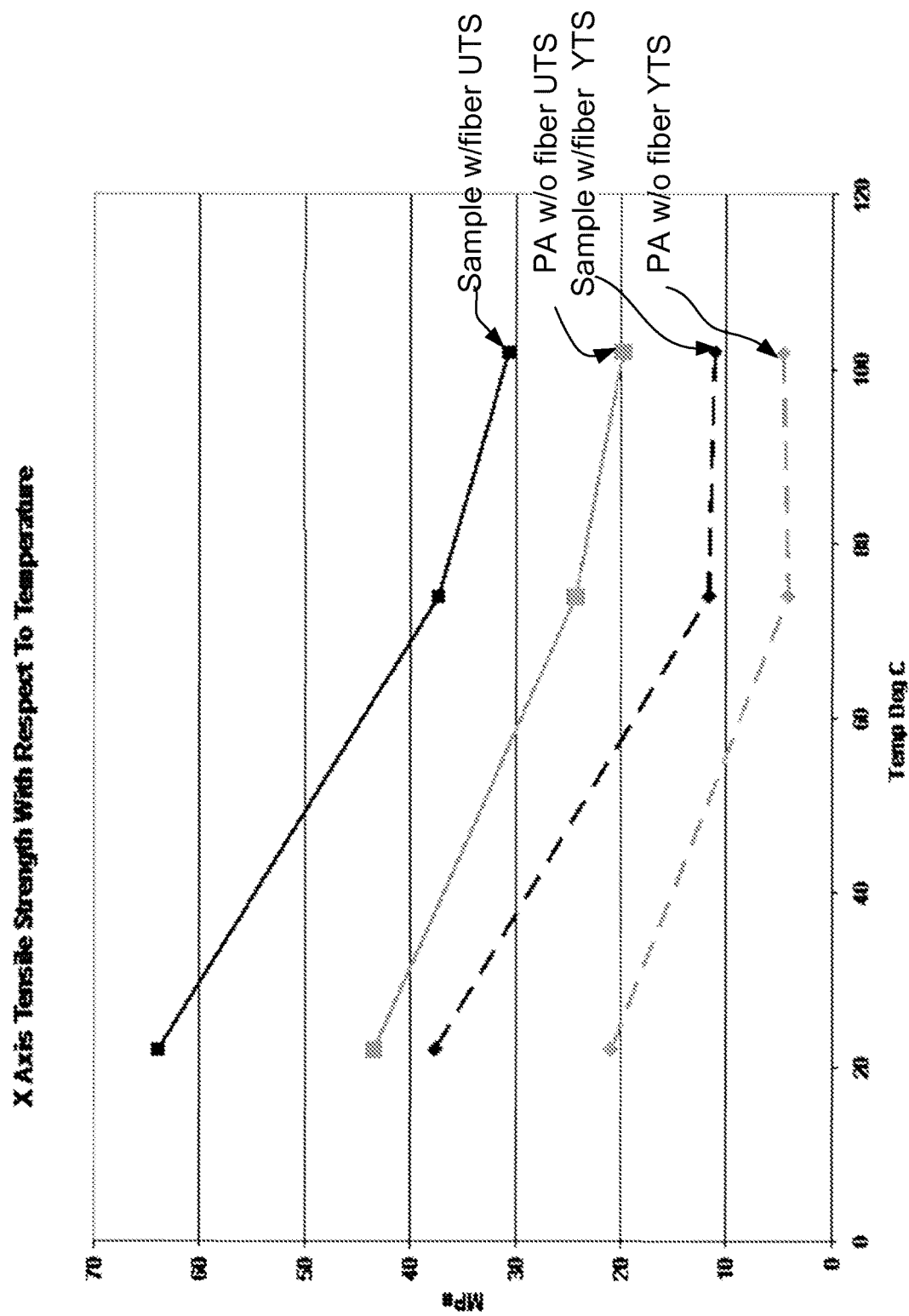
FIG. 29 depicts x-axis tensile strength data of manufactured parts verses controls as a function of temperature in accordance with an embodiment.
Figure 30:
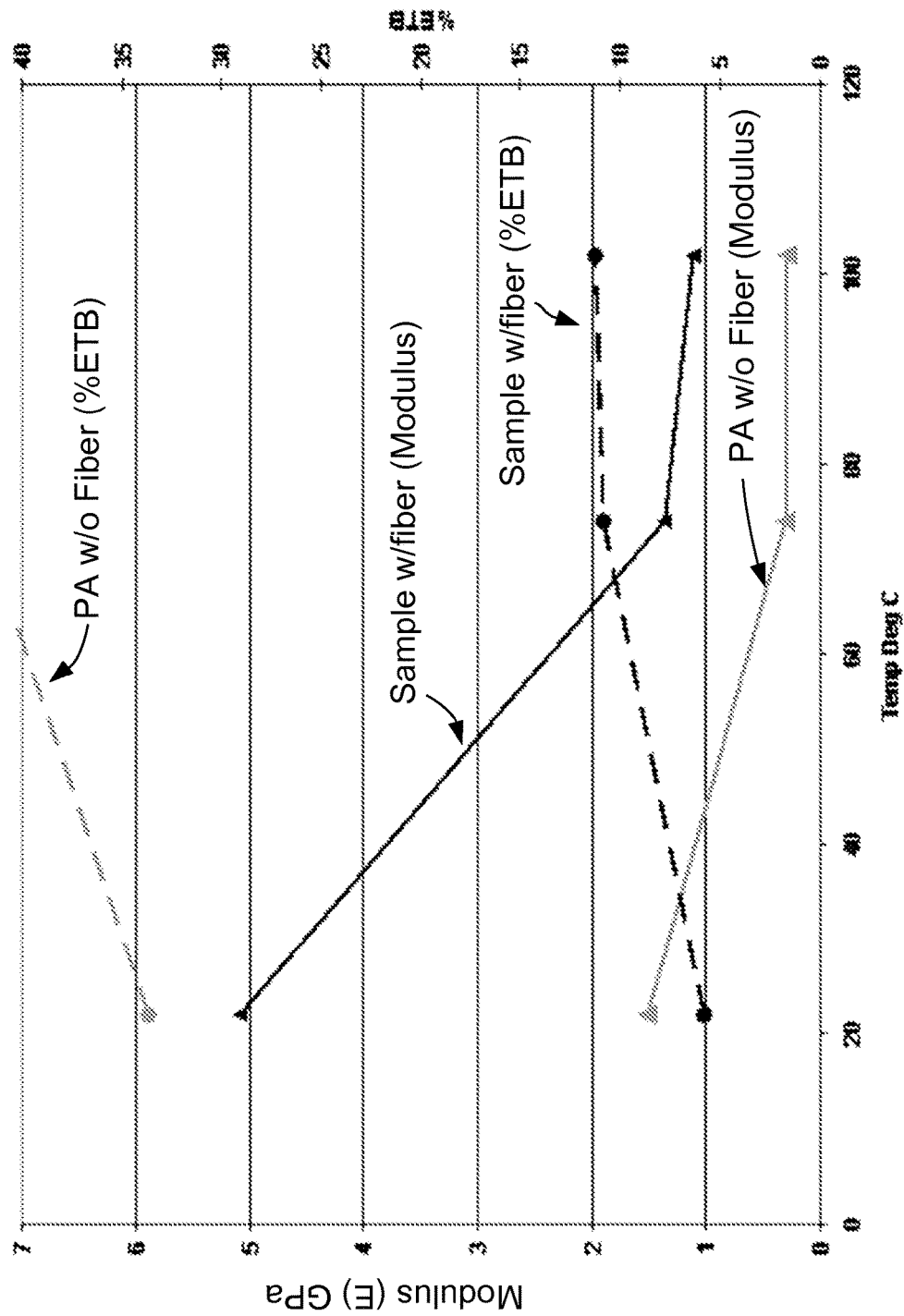
FIG. 30 depicts x-axis tensile modulus and percent elongation to break data of manufactured parts verses controls as a function of temperature in accordance with an embodiment.

FIGS. 29 and 30 depict the temperate-dependent mechanical performance data of the manufactured parts measured in the x-machine direction in accordance with the materials and methods herein disclosed compared with PA 11 without reinforcing fiber. Thus, FIGS. 29 and 30 show significant improvement over the control for the representative samples as to UTS, TYS, Modulus, and percent elongation to break over a wide temperature range (20-100 Centigrade).

The description of the different embodiments has been presented for purposes of illustration and description, and it is not intended to be exhaustive or limited to the embodiments in the form disclosed. Many modifications and variations will be apparent to those of ordinary skill in the art. Although the different embodiments have been described with respect to parts for an aircraft, other embodiments may be applied to parts for other types of objects.

For example, without limitation, other embodiments may be applied to a mobile platform, a stationary platform, a land-based structure, an aquatic-based structure, a space-based structure, and/or some other suitable object.

More specifically, the different embodiments may be applied to, for example, without limitation, in whole or in part to the manufacture of aerospace vehicle, a drone, missile, a rocket, a weapon, a submarine, a bus, a personnel carrier, a tank, a train, an automobile, a spacecraft, a space station, a satellite, a surface ship, a power plant, a dam, a manufacturing facility, a building, and/or some other suitable object.

Further, different embodiments may provide different advantages as compared to other embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

We claim:

1. A method for manufacturing parts, the method comprising:
    introducing directed energy to powder particles comprising a plurality of anisotropically aligned reinforcing fibers with a first average fiber orientation; and
    providing a manufactured part from the powder particles, the manufactured part having a second average fiber orientation that is substantially more isotropic compared to the first average fiber orientation.

2. The method of claim 1, wherein the manufactured part has essentially isotropic mechanical properties in at least two dimensions.

3. The method of claim 1, wherein the average fiber length of the reinforcing fibers is between about 100 microns to about 500 microns and the average fiber diameter of the reinforcing fibers is between about 4 microns to about 8 microns.

4. The method of claim 3, wherein the introducing directed energy is performed using a selective laser sintering (SLS) process.

5. The method of claim 4, wherein the powder particles or reinforcing fibers absorbs electromagnetic radiation commensurate with the excitation wavelength of the laser of the SLS process.

6. The method of claim 1, wherein the powder particles size distribution is from about 20 micrometers to about 150 micrometers with an average particle size between around 75 micrometers to around 125 micrometers.

7. The method of claim 1, wherein the average fiber length of the reinforcing fibers in the manufactured part is between about 25 microns to about 100 microns and the average fiber diameter of the reinforcing fibers is between about 4 microns to about 8 microns.

8. The method of claim 1, wherein the reinforcing fibers is selected from polymer, glass, carbon, ceramic, or combinations thereof.

9. The method of claim 1, wherein the powder particles have a Gaussian particle size distribution and/or have a substantially spherical shape.

10. The method of claim 1, wherein the powder particles is a metal and the reinforcing fibers is a ceramic fiber or carbon fiber.

11. The method of claim 1, wherein the powder particles is selected from at least one of polyamide, a polyphenylene sulfide, a polyetherketoneketone, a polyamide blend, a polyphenylene sulfide blend, and a polyetherketoneketone blend.

12. The method of claim 1, wherein forming the powder particles comprises cryo-grinding with the reinforcing fibers.

13. The method of claim 12, further comprising heating the powder particles after the cryo-grinding.

14. The method of claim 1, wherein the manufactured part is a mobile platform, a stationary platform, a land-based structure, an aquatic-based structure, a space-based structure, an aerospace vehicle, a drone, a missile, a rocket, a surface ship, a tank, a personnel carrier, a train, a spacecraft, a space station, a satellite, a submarine, an automobile, a power plant, a bridge, a dam, a manufacturing facility, a building, and a component thereof.

15. A powder for additive manufacturing, the powder comprising:
    a matrix material that is metal or comprised of a polymer that is semi-crystalline, is capable of entering a liquid state and a crystalline state within an overlapping range of temperatures, having a particle size distribution capable of allowing particles to flow through openings formed by larger particles in the particle size distribution;
    a plurality of fibers within the matrix material, a plurality of fibers having a calculated main fiber direction vector, wherein the main direction vector correlates with an average fiber orientation within the matrix material; and
    wherein the average fiber orientation is of an angle less than 30 degrees of that of the calculated main fiber direction vector.

16. The powder of claim 15, wherein the matrix material is a polymer selected from one of a polyamide, a polyphenylene sulfide, a polyetherketoneketone, a polyamide blend, a polyphenylene sulfide blend, and a polyetherketoneketone blend.

17. The powder of claim 15, wherein the particle has a particle size distribution of between about 20 micrometers to about 150 micrometers and an average particle size between about 75 micrometers to about 125 micrometers.

18. The powder of claim 15, wherein the fibers have an average fiber length of between about 10 microns to about 250 microns and an average fiber diameter of between about 3 microns to about 8 microns.

19. The powder of claim 15, wherein the fibers have an average fiber length of between about 25 microns to about 75 microns and an average fiber diameter is between about 4 microns to about 6 microns.

* * * * *